United States Patent
White et al.

(10) Patent No.: US 6,299,571 B1
(45) Date of Patent: Oct. 9, 2001

(54) SYSTEM AND METHOD FOR CONTROLLING DEFLECTION OF A DYNAMIC SURFACE

(75) Inventors: James S. White, Shaftsbury, VT (US); Edward C. Kirchner, Pittsfield, MA (US)

(73) Assignee: Morrison Berkshire, Inc., North Adams, MA (US)

( * ) Notice: Subject to any disclaimer, the term of this patent is extended or adjusted under 35 U.S.C. 154(b) by 0 days.

(21) Appl. No.: 09/425,594

(22) Filed: Oct. 22, 1999

(51) Int. Cl.[7] .................................................. B05C 1/08
(52) U.S. Cl. ................................. 492/10; 492/16; 492/20
(58) Field of Search ............................ 492/10, 9, 7, 16, 492/20; 100/99, 153, 176; 73/862.55, 862.68; 72/10.4, 14.4

(56) References Cited

U.S. PATENT DOCUMENTS

| | | | |
|---|---|---|---|
| 3,086,279 | 4/1963 | Alexeff | 29/123 |
| 3,106,153 | 10/1963 | Westbrook | 100/155 |
| 3,119,324 | 1/1964 | Justus | 100/170 |
| 3,389,450 | 6/1968 | Robertson | 29/116 |
| 3,430,319 | 3/1969 | Skaugen | 29/116 |
| 3,604,087 | 9/1971 | Beck | 29/127 |
| 4,062,097 | 12/1977 | Riihinen | 29/116 |
| 4,301,582 | 11/1981 | Riihinen | 29/116 |
| 4,357,743 | 11/1982 | Hefter et al. | 29/116 |
| 4,376,330 | 3/1983 | Weidinger et al. | 29/116 |
| 4,485,540 | 12/1984 | Riihinen | 29/116 |
| 5,127,141 | 7/1992 | Roerig et al. | 29/116.2 |
| 5,197,174 | 3/1993 | Lehmann | 492/7 |
| 5,290,223 | 3/1994 | Lehmann | 492/7 |
| 5,386,769 | 2/1995 | Rinne | 100/93 |
| 5,487,715 | 1/1996 | Schiel | 492/16 |
| 5,520,877 | 5/1996 | Snelling | 428/36.9 |
| 5,562,027 | * 10/1996 | Moore | 492/10 |
| 5,592,875 | * 1/1997 | Moschel | 100/99 |
| 5,685,813 | * 11/1997 | Kivioja et al. | 492/7 |
| 5,699,729 | * 12/1997 | Moschel | 100/99 |
| 5,743,839 | 4/1998 | Niskanen | 492/20 |
| 5,785,636 | 7/1998 | Bonander et al. | 492/7 |
| 5,813,959 | 9/1998 | Hader et al. | 492/7 |
| 5,965,220 | * 10/1999 | Schopping . | |
| 6,109,285 | 8/2000 | Kivioja et al. | 137/14 |

\* cited by examiner

Primary Examiner—I Cuda-Rosenbaum
(74) Attorney, Agent, or Firm—Lerner, David, Littenberg, Krumholz & Mentlik, LLP

(57) ABSTRACT

A system for controlling deflection of a dynamic surface includes at least one sensor in communication with the dynamic surface for detecting the presence of a deflecting force on the dynamic surface and generating a feedback signal proportional to the deflecting force. The system includes a controller in communication with the at least one sensor for receiving the feedback signal and generating an output signal in response to the feedback signal. At least one piezoelectric actuator is in communication with the dynamic surface and in communication with the controller for receiving the output signal and applying a counter deflecting force on the dynamic surface for removing the deflection from the dynamic surface. In other preferred embodiments, the piezoelectric actuators maintain the dynamic surface in a preferred shape, such as a curved surface.

61 Claims, 17 Drawing Sheets

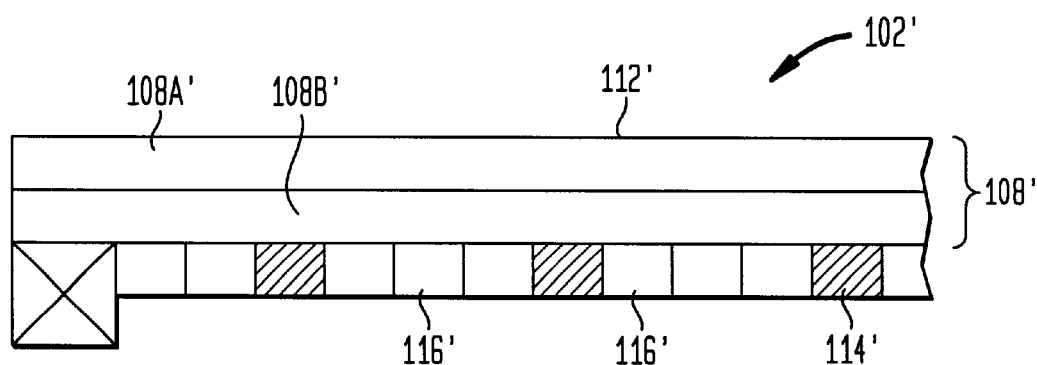
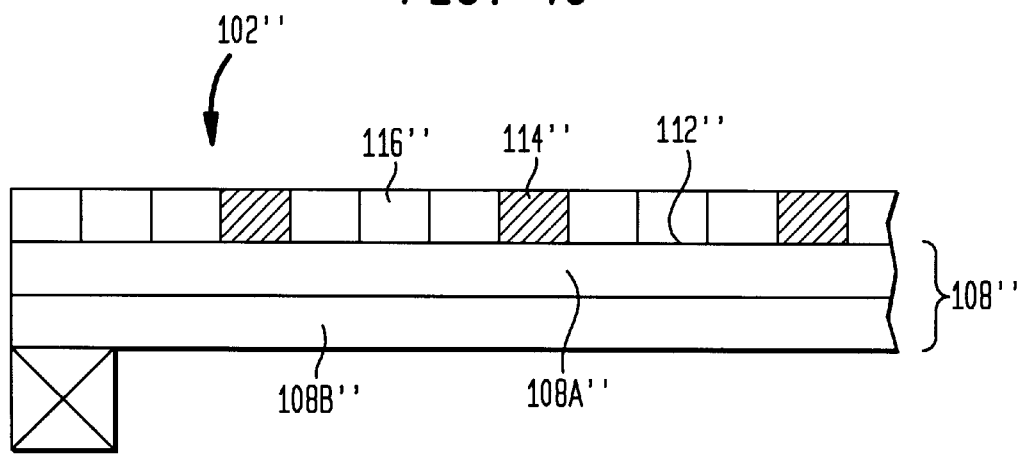

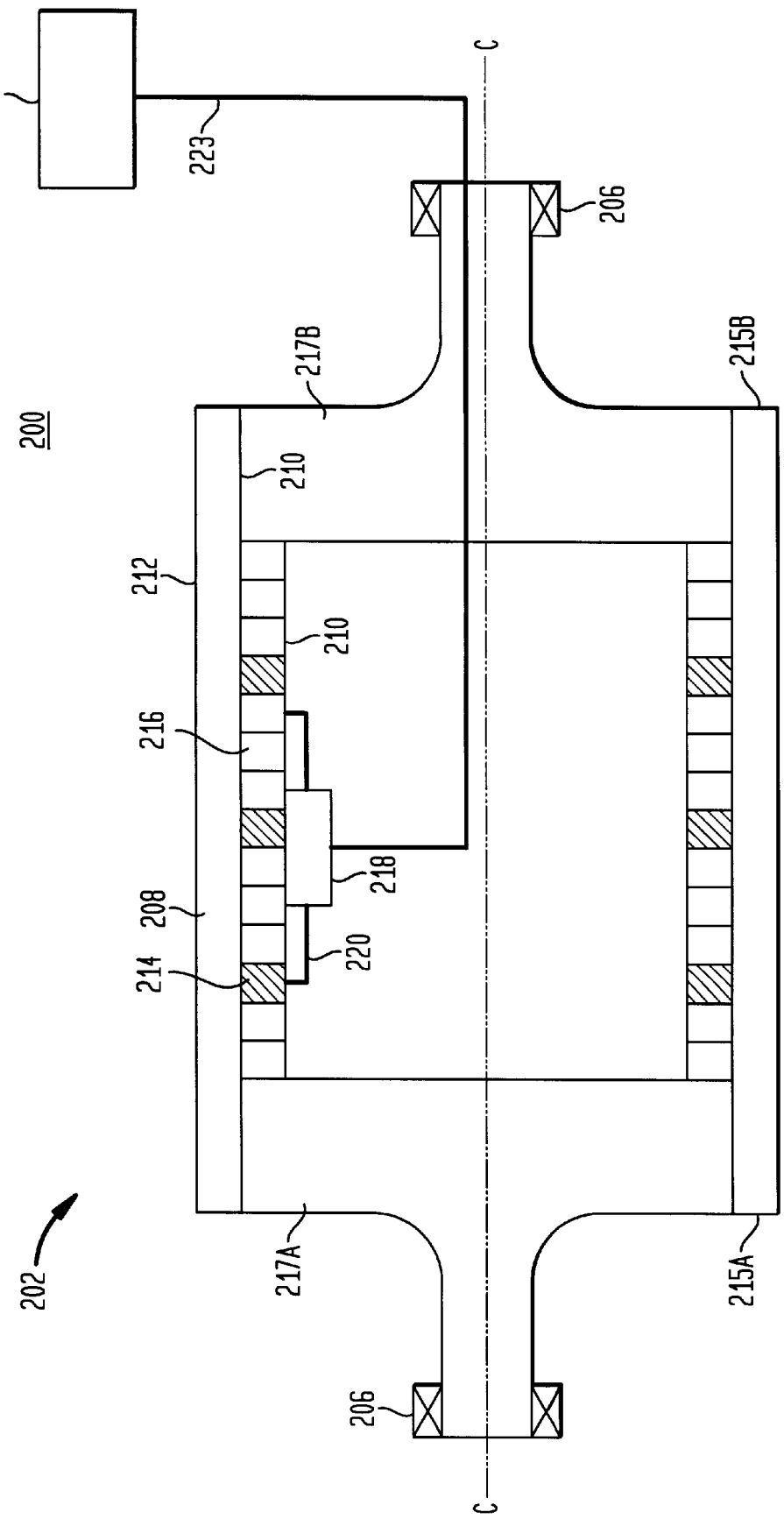

SYSTEM AND METHOD FOR CONTROLLING DEFLECTION OF A DYNAMIC SURFACE

FIELD OF THE INVENTION

The present invention relates to controlling the shape of dynamic surfaces and in particular to a system for controlling deflection of a dynamic surface of a roll.

BACKGROUND OF THE INVENTION

In many industries, such as paper making, food processing, and textiles, or any other industry that processes a web of material, rolls are used for various types of processing functions, and in many instances, the straightness of the roll is very important. For example, in a paper making assembly, roll deflection may adversely affect the quality of the product being produced because the surface of the paper reflects the shape of the roll over which it passes. Thus, it is desirable for the rolls to be as smooth as possible and devoid of any imperfections, deflections or variations so that the paper that is formed will be smooth and uniform. In addition to resulting in the production of inferior products, roll deflection may also result in damage to the roll itself or the machinery containing the roll. Thus, various attempts have been made to control the shape of rolls so as to avoid the problems described above.

U.S. Pat. No. 5,785,636 to Bonander discloses a roll having an outer surface made of a fabricated fiber matrix for strengthening and reinforcing the roll to minimize roll deflection.

U.S. Pat. No. No. 2,908,964 discloses a controllable convex roll having a pressure fluid chamber positioned between a roll axle and the roll shell. Adjusting the pressure in the pressure fluid chamber controls deflection of the roll shell. However, the roll disclosed in the '964 patent has a number of problems associated therewith including sealing difficulties resulting in leakage of pressure fluid. In addition, the roll disclosed in the '964 patent has a relatively slow response time for changing the pressure of the pressure fluid, requiring about 30 seconds to increase the pressure and about 10 seconds to decrease the pressure. As a result, the '964 patent system is unable to rapidly respond to deflections in the roll and a considerable quantity of paper is wasted when such a roll is used in paper machines. Moreover, rolls having a convex exterior surface have a limited operating range and may obtain a uniform pressure across the exterior surface only at a given load.

U.S. Pat. No. 5,197,174 to Lehmann discloses a controlled deflection roll having a rotatable roll shell supported by a row of hydraulic support elements. The support elements are connected with fluid lines that supply hydraulic fluid to the support elements for generating a pressure force at the exterior surface of the roll. The '174 patent also discloses a control device which controls the supply of the hydraulic fluid sent to each hydraulic support element. However, the Lehmann system also has a relatively slow response time for correcting a roll deflection condition.

U.S. Pat. No. 4,301,582 to Riihinen discloses a system that removes deflections from a roll using magnetic forces. The roll has a non-rotating axle with ends having a load imposed thereat and a cylindrical shell rotatably supported by bearings on the axle. A magnetic core is formed in the axle and a plurality of pole shoes are spaced from the shell by an air gap. A plurality of electromagnetic windings, each wound on the core at one of the pole shoes, produce a magnetic compensating force field between the shell and the core for responding to deflections in the roll.

U.S. Pat. No. 4,357,743 to Hefter, et al., discloses a controlled deflection roll having a roll shell which is radially movable in at least one plane in relation to a roll support. Position feelers or sensors are arranged at the ends of the roll shell for detecting one or more deflections in the roll shell as a function of deviations from a predetermined reference or set point. The position feelers control regulators operatively associated with pressure or support elements positioned between the roll support and the roll shell so that the roll shell is maintained in the reference or set position.

U.S. Pat. No. 4,062,097 to Riihinen discloses a roll having magnetic deflection compensation that may be used in the calender or press section of a paper machine. The roll has an inner non-rotating axle and an outer shell surrounding and rotatable with respect to the axle, the axle and the shell having a common axis. The axle includes an inner magnetic structure while the shell includes an outer magnetic structure that rotates together with the shell. These inner and outer magnetic structures cooperate to provide attraction between the shell and axle on one side of the above axis and repulsion between the shell and axle on the opposite side of the axis, thereby achieving deflection control and/or compensation.

Other techniques used to reduce the detrimental effects of roll deflections include running process machinery at slower speeds in order to avoid resonance problems, and using back-up roll systems to reduce deflections. Further techniques include floating a roll in a fluid medium or using plural bearings for each bearing journal.

Therefore, there is a need to have a deflection control system for a roll that rapidly eliminates deflections in a roll. There is also a need for a deflection control system that effectively responds to deformations of the roll caused by various sources such as induced vibrations, external loading and thermal loading. There is also a need for a deflection control system that enables deflections to be induced into the roll for any purpose necessary.

SUMMARY OF THE INVENTION

The present invention addresses the above-identified problems by providing a system and method for controlling deflection of a dynamic surface. In its broadest sense, the present invention may be used to remove undesirable deflections from a dynamic surface or to actively control the dynamic surface so as to conform the dynamic surface into a desired shape. The present invention may also be used to control vibration of a dynamic surface. In preferred embodiments, the present invention may be used to control deflection of a dynamic surface on any object that rotates including, but not limited to, a roll that engages a web, a gear, wheels and/or tires. In highly preferred embodiments, the inventive system includes at least one piezoelectric actuator in communication with a roll for applying compression and tensile forces to the roll so as to control roll deflection and/or force one or more surfaces of the roll to assume certain shapes.

As is well known to those skilled in the art, piezoelectric elements may be used to covert electrical energy into mechanical energy and vice versa. For nanopositioning, the precise motion that results when an electric field is applied to a piezoelectric material is of great value. Actuators using this effect have changed the world of precision positioning. As used herein, a piezoelectric actuator means a piezoelectric device or element, or any electronic device that operates in a similar fashion to a piezoelectric element such as an electromagnet or a magnetostatic device.

The present invention may be used for a broad range of applications whereby the system components move at various speeds. For example, the deflection control system of the present invention can be used when making a paper web moving at approximately 5000 feet/minute, when making textile materials moving at approximately 100–300 feet/minute or when making paper maker's clothing (PMC) moving at approximately 1–30 feet/minute.

In accordance with one aspect of the present invention, there is provided a system for controlling deflection of a dynamic surface, such as the exterior surface of a roll. As set forth herein, the term "dynamic surface" means any surface that may change with respect to time, regardless of whether the change occurs over 5–10 minutes or over a time period as small as one microsecond. However, as microtechnology improves and microprocessors operate at faster speeds, it is contemplated that the present invention could be used for dynamic surfaces that change over a period of time as small as 1 nanosecond. The system preferably includes at least one sensor in communication with the dynamic surface for detecting the presence of a force on the dynamic surface and generating a feedback signal proportional to the force. As used herein, the term "force" includes any force to which the dynamic surface may be subjected including pressure forces, compressive forces, tensile forces, resonance, vibrations, thermal action or other process forces. Moreover, the above-listed forces may be applied in any direction with respect to the dynamic surface including directions that are substantially perpendicular to the dynamic surface and directions that are substantially parallel to the dynamic surface. The system also includes a controller in communication with the at least one sensor for receiving the feedback signal from the sensor and generating an output signal responsive to the feedback signal. The magnitude of the output signal is generally proportional to the magnitude of the feedback signal.

The system also preferably includes at least one piezoelectric actuator in communication with the dynamic surface and in signal receiving and sending communication with the controller for receiving the output signal from the controller and applying a counter deflecting force on the surface. The counter deflecting force applied by the piezoelectric actuator is preferably responsive to the detection of a deflection in the dynamic surface of the roll, whereby the piezoelectric actuator exerts the counter deflecting force to remove the deflection and return the dynamic surface to a preferred shape or configuration. The piezoelectric actuator may also be activated to apply a counter deflecting force so as to force the dynamic surface into a preferred shape, such as a roll having a convex surface.

The application of piezoelectric elements to dynamic surfaces, such as the exterior surface of a roll, resolves the problem of roll deflection in a much more efficient manner than is available with the existing technologies described above. Piezoelectric actuators can apply forces independently, and in various combinations, compared to most if not all of the existing roll control methodologies. Piezoelectric actuators are extremely precise, allowing repeatable nanometer and sub-nanometer movements. In addition, piezoelectric actuators can produce significant amounts of force over relatively small areas and are capable of moving heavy loads of up to several tons. Moreover, the response time of piezoelectric elements is in the kilohertz range so that they may be activated at very high frequencies. This is because piezoelectric elements derive their motion through solid state crystal effects and have no moving parts. Finally, piezoelectric elements require very little power and require no maintenance.

The at least one piezoelectric actuator preferably includes a plurality of piezoelectric actuators that are provided in contact with the dynamic surface. The piezoelectric actuators are preferably piezoelectric foils having a length of approximately 1 to 5 centimeters, a width of approximately 1 to 5 centimeters and a height of less than 1 centimeter. As such, one piezoelectric actuator preferably covers an area of approximately 1–25 $cm^2$. In other preferred embodiments, piezoelectric actuators of any size and/or dimension may be used. Thus, the present invention is not limited to using actuators of the size/type listed above.

The present invention preferably applies a plurality of piezoelectric actuators in contact with the dynamic surface of a roll so that relatively large controlling forces may be applied to the dynamic surface. Because each piezoelectric actuator can be controlled separately by the controller, it is possible to create virtually any type of deflection or shape in the dynamic surface that is desired, thereby providing for unlimited performance possibilities not available in prior art technologies.

In one preferred embodiment, the dynamic surface is preferably provided on a roll shell, such as a roll shell, secured over a roll support. The roll shell is preferably flexible and substantially cylindrical, has an interior surface defining an inner diameter of the roll shell and an exterior surface defining an outer diameter of the roll shell. In certain preferred embodiments, the exterior surface of the roll shell includes the dynamic surface. The sensors and piezoelectric actuators are preferably connected to the interior surface of the roll shell. However, in other embodiments, the sensors and piezoelectric actuators may be connected to either the inner or exterior surface of the roll shell, or any combination thereof. In other embodiments, the sensors are in communication with, but not in contact with, the roll shell. In certain embodiments the roll is what is commonly referred to as a non-coated roll, however, in other embodiments the roll may be a coated roll.

The roll shell preferably has a longitudinal axis and preferably rotates about a central axis substantially parallel to the longitudinal axis. The roll shell is desirably mounted on a roll shell support that supports rotation of the roll shell about the central axis thereof. The roll shell support may include an axle mounted to an external support structure. The axle may rotate.

In certain embodiments, the counter deflecting force applied by the piezoelectric actuators generates either a compressive force or a tensile force on the dynamic surface of the roll shell. The compressive and tensile forces are generally opposed to one another. In other words, the compressive forces compress the dynamic surface towards the center of the roll shell while the tensile forces stretch the dynamic surface toward the ends of the shell. The piezoelectric actuators may be aligned to exert compressive and tensile forces in directions substantially parallel to or substantially perpendicular to the longitudinal axis of the shell. The piezoelectric actuators may also be aligned to apply compressive and tensile forces to the dynamic surface in a plurality of various directions that are neither perpendicular to nor parallel to the longitudinal axis of the shell.

The deflection control system of the present invention preferably includes a plurality of sensors in communication with the shell. The sensors are designed for detecting and/or measuring the magnitude of deflecting forces acting upon the dynamic surface of the shell. The sensors are preferably spaced apart from one another and interspersed between the piezoelectric actuators. In certain preferred embodiments, the piezoelectric actuators are aligned in rows over the interior surface of the shell and the sensors are interspersed between the piezoelectric actuators. The rows of aligned piezoelectric actuators may extend in directions substantially parallel to or perpendicular to the longitudinal axis of the shell, or may extend in any number of directions between those that are substantially perpendicular and those that are substantially parallel to the longitudinal axis of the shell. The ratio of piezoelectric actuators to sensors is preferably about 100:1. The sensor may be one of a wide variety of sensors including but not limited to a piezoelectric element, a strain gauge, a laser used in conjunction with a reflective element, an optical device, a capacitive device and/or a magnetic device. In other preferred embodiments, the ratio of piezoelectric actuators to sensors will vary. The ratio may be 1:1, or the number of sensors may outnumber the number of piezoelectric actuators.

The deflection control system of the present invention also preferably includes a controller having a microprocessor and a memory device. The memory may have stored therein look-up tables, a control strategy algorithm and/or an adaptive feedback control strategy algorithm. The controller is preferably designed for receiving feedback signals from the sensors. The controller then processes the feedback signals to determine whether signals indicate the presence of a deflection. If an undesirable deflection is detected at one or more regions of the dynamic surface, the controller transmits output signals to the piezoelectric actuators at those deflected regions for removing the deflection(s) and/or changing the shape of the dynamic surface.

The particular type of output signal transmitted to each piezoelectric actuator determines whether a compressive force or a tensile force is applied to the dynamic surface. For example, the control strategy may be to keep the dynamic surface in a neutral condition so that if a deflected region of the dynamic surface is under compression, then an output signal transmitted to the piezoelectric actuator will activate the piezoelectric actuator to apply a tensile force to the deflected region. On the other hand, if a deflected region of the dynamic surface is under a tensile force, the output signal transmitted to the piezoelectric actuator will activate the piezoelectric actuator to apply a compressive force to the deflected region.

In certain preferred embodiments, the system for controlling deflection of a dynamic surface may be utilized for a web support structure located between two rolls so as to support the web as it passes by the web support structure. In these particular embodiments, the web support structure includes a supporting element having a web support layer. The web support layer has a top surface including the dynamic surface and a bottom surface remote therefrom. The dynamic surface is designed to engage the web passing thereover, such as a web of partially formed paper moving over the dynamic surface during a paper forming process. As set forth above, the control system of the present invention may also be used for processing textile materials and/or paper maker's clothing felts or any other process involving web handling. In these particular embodiments, the sensors and the piezoelectric actuators are provided in contact with the second surface of the web support layer. However, in other embodiments, the sensors and piezoelectric actuators may be in contact with either the first surface or the second surface or any combination thereof. The dynamic surface of the web support layer may be substantially flat or have an arcuate section. In certain embodiments, the one or more sensors preferably determine the position of the dynamic surface in relation to the supporting element for detecting the presence of a deflecting force upon the dynamic surface.

In other preferred embodiments, a dynamic surface has a predetermined shape that is stored within the memory of the controller. In this embodiment, the system for controlling deflection of the dynamic surface includes at least one sensor connected to the dynamic surface for sensing a change in the predetermined shape of the dynamic surface and generating a feedback signal proportional to a magnitude of the change. The system includes a controller in communication with the one or more sensors for receiving the feedback signal and generating an output signal in response thereto. The controller analyzes the one or more feedback signals by comparing the feedback signals with data stored in the memory thereof. If necessary, the controller then generates one or more output signals and transmits these output signals to the piezoelectric actuators in contact with the dynamic surface. Upon receiving the output signals, the piezoelectric actuators are activated for applying a counter deflecting force on the dynamic surface for returning the dynamic surface to the predetermined shape. Once the dynamic surface has been returned to the predetermined shape, the sensors that detected the change in the predetermined shape would then generate feedback signals indicating that the dynamic surface was once again in the predetermined shape. As a result, the piezoelectric actuators remain inactive. The piezoelectric actuators remain inactive until their activation is again necessary in order to return the dynamic surface to its predetermined shape.

In still further embodiments, at least one mass overlies at least one of the piezoelectric actuators. In these embodiments, at least one of the piezoelectric actuators is sandwiched between the at least one mass and the interior surface of the shell. In certain applications, there is a need to operate rolls at a speed that coincides with the resonance of the roll. When operated at or near resonance, a roll's dynamic response may cause detrimental effects on the roll itself, the machinery containing the roll and the process that the roll is completing. Using piezoelectric devices mounted between the roll (or other machine members) and a mass, and having the piezoelectric actuator connected to and controlled by a properly designed control device, vibrations in the dynamic surface of the roll can be reduced and/or controlled, thereby eliminating or reducing detrimental effects. Similarly, vibrations can be induced into rolls or other machine members for any purposes necessary.

In still further embodiments, a method of controlling the deflection of a dynamic surface includes providing a dynamic surface having a predetermined shape and providing at least one piezoelectric actuator connected to the dynamic surface for applying a counter deflecting force thereto. For purposes of the present application, the terminology "counter deflecting force" means that the piezoelectric actuator will be activated to provide either a compression force or a tensile force to the portion of the dynamic surface to which the piezoelectric actuator is engaged. The method also includes sensing a change in the predetermined shape of the dynamic surface and transmitting the feedback signal from the sensor to the controller. The controller then generates an output signal that is proportional to the feedback signal and transmits the output signal to the piezoelectric actuator. Upon receiving the output signal, the piezoelectric actuator is activated for applying the counter force to the dynamic surface.

BRIEF DESCRIPTION OF THE DRAWINGS

FIG. 4B is a fragmentary schematic side view of a roll, in accordance with further preferred embodiments of the present invention.

FIG. 4C is a fragmentary schematic side view of a roll, in accordance with still further preferred embodiments of the present invention.

FIG. 11A is a schematic side view of a noncoated roll including a system for controlling deflection of the roll, in accordance with further preferred embodiments of the present invention.

DETAILED DESCRIPTION OF PREFERRED EMBODIMENTS

Figure 1A:
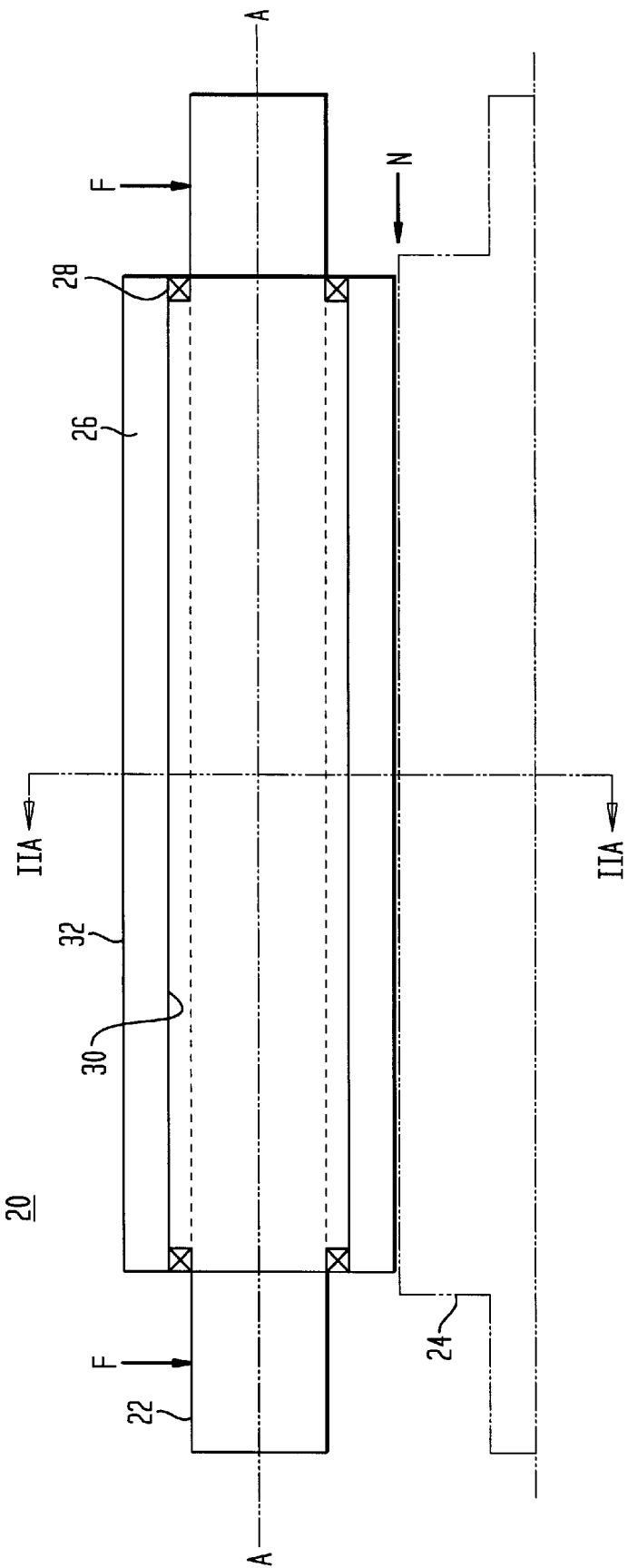
FIG. 1A is a schematic side view of a prior art roll and mating roll engaging a web at a nip.

FIGS. 1A–3B show prior art rolls. Referring to FIG. 1A, the roll 20 is a non-coated roll including an axle 22 loaded at its ends. A non-coated roll generally includes rolls having metal tubes, such as a steel roll or tube. In contrast, a coated roll is understood to be a roll that is coated with a layer of flexible material such as rubber, fabric or cloth. The loading forces F are shown in FIG. 1. The forces F, together with the weight of the roll, provide the required nip pressure at the nip N formed by the interface of roll 20 and a mating roll 24. The forces shown in FIG. 1 and described above are dependent upon the position of the roll 20 relative to the mating roll 24. For example, these forces would change if the roll 20 were under the mating roll 24 (i.e., under the nip). The roll 20 includes a roll shell 26 that is secured about axle 22 via bearings 28. The roll shell has an interior surface 30 and an exterior surface 32. The longitudinal axis or centerline of the axle 22 is indicated by A—A.

Figure 1B:
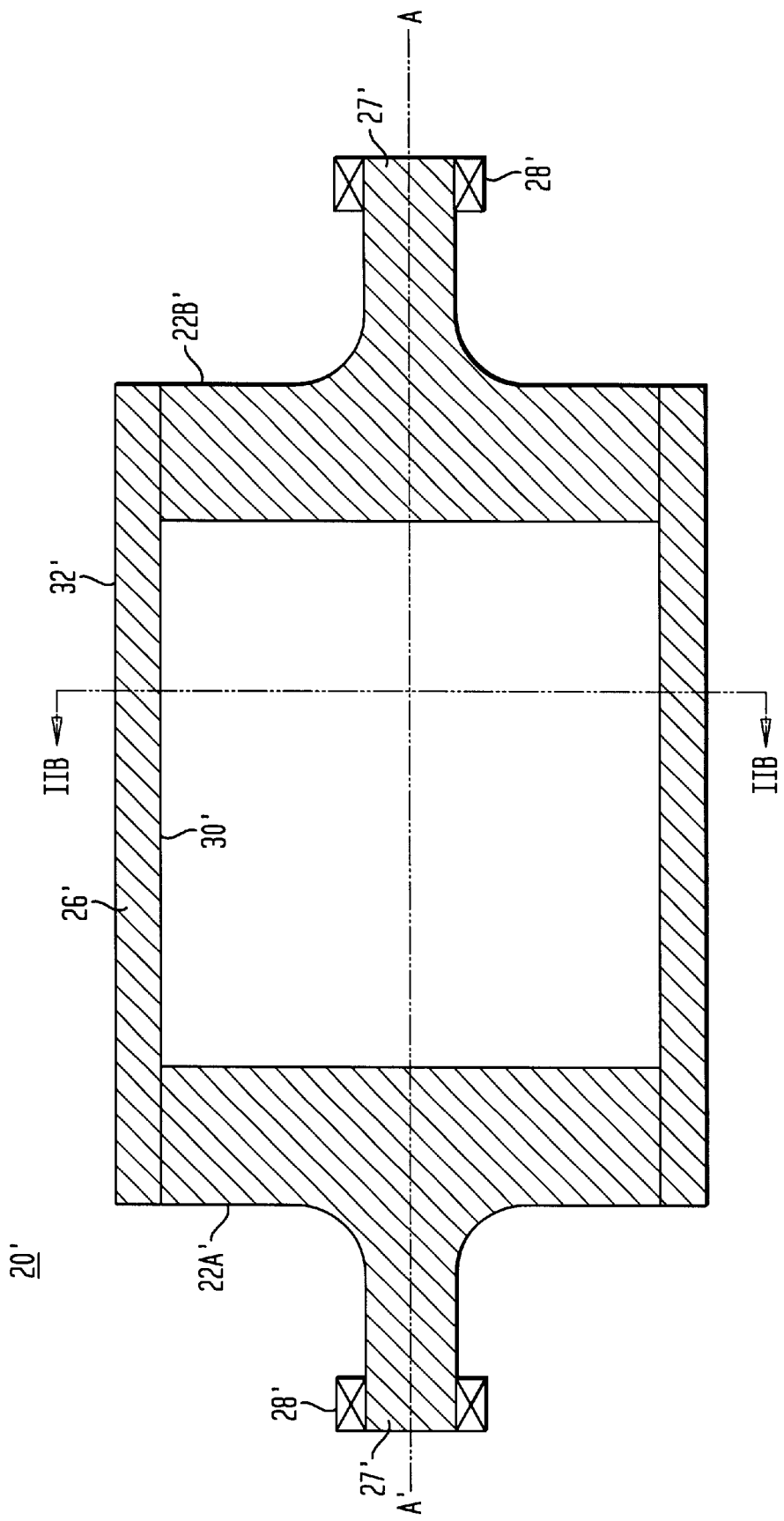
FIG. 1B is a schematic side view of another prior art roll engaging a web.

FIG. 1B shows another prior art non-coated roll 20' that does not have an axle extending therethrough as shown in FIG. 1A. The roll 20' includes a roll shell 26' having an interior surface 30' and an exterior surface 32'. The roll 20' includes supports 22A' and 22B' that support the interior surface 30' of the roll shell 26' as the roll shell rotates about a longitudinal axis A'—A'. The supports 22A' and 22B' includes extensions 27' supported by bearings 28'.

Figure 2A:
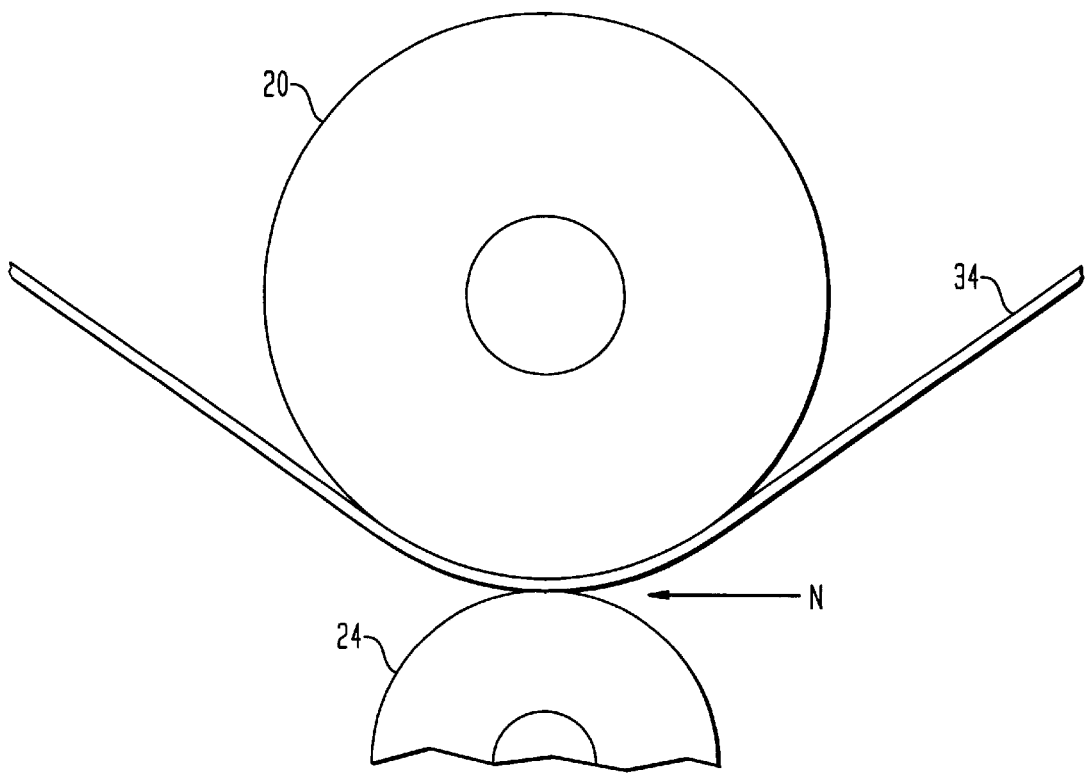
FIG. 2A is a sectional view of the prior art roll of FIG. 1A taken along lines IIA—IIA.

FIG. 2A shows a cross sectional view of the roll 20 and the mating roll 24 of FIG. 1A taken along line IIA—IIA of FIG. 1A. The roll 20 and mating roll 24 are designed for allowing a web 34 to pass therebetween at the nip N. Mating rolls facilitate the development of nip pressures between two rolls, thereby minimizing deflection of one or more rolls. Mating rolls, such as mating roll 24, may also be used as backup or support rolls. The roll 20 and the mating roll 24 may typically be incorporated into any assembly that processes a web of material such as a paper making assembly, a textile making assembly, a paper maker's clothing making assembly, a printing assembly, a metal rolling assembly, an embossing assembly or a calendaring assembly.

Figure 2B:
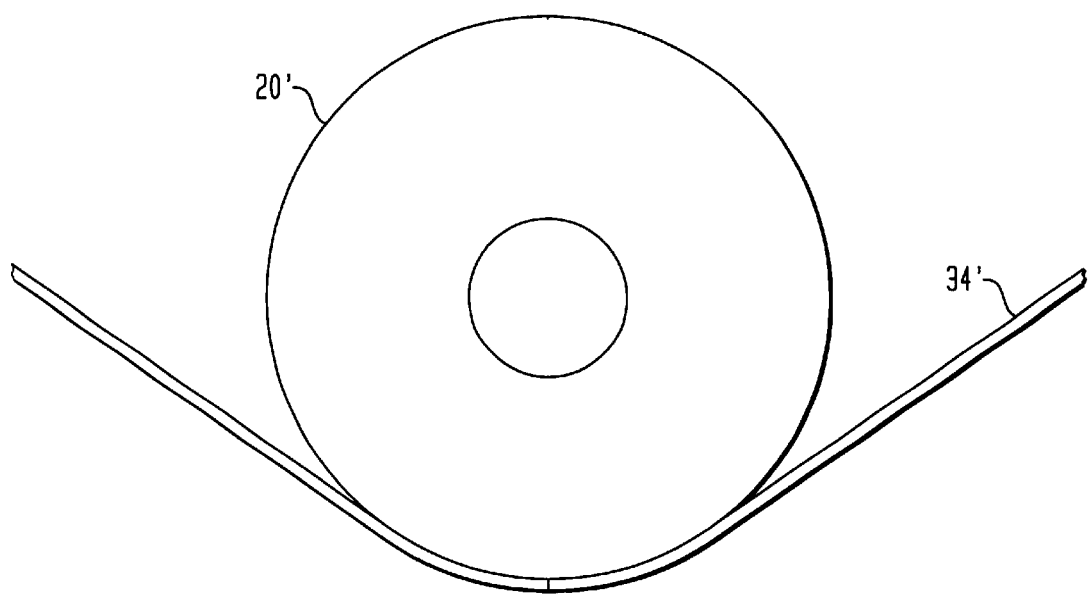
FIG. 2 is a sectional view of the prior art roll of FIG. 1B taken along lines IIB—IIB.

FIG. 2B shows a cross-sectional view of the roll 20' of FIG. 1B taken along line IIB—IIB of FIG. 1B. The roll 20' of FIG. 2B is a singular roll that is not in contact with a mating roll for creating nip pressure.

Figure 3A:
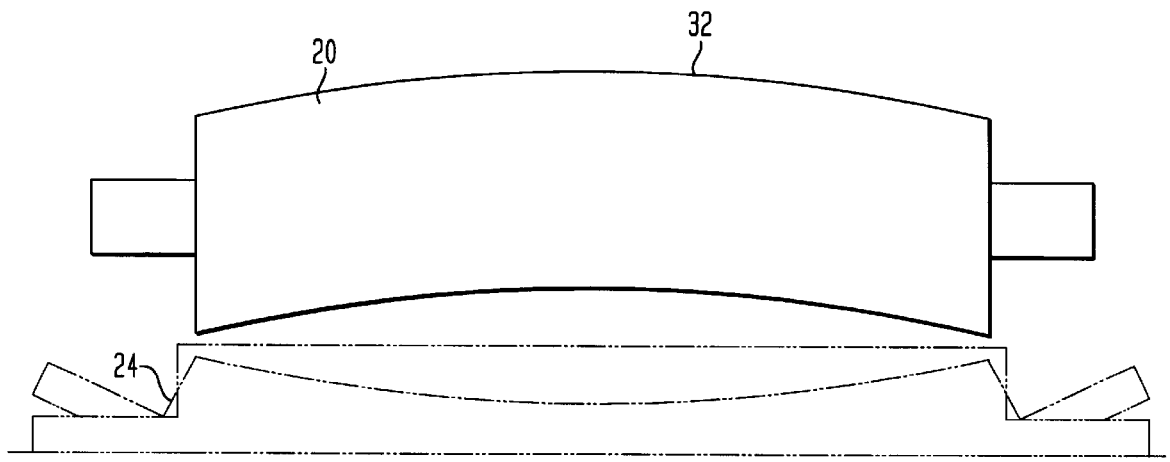
FIG. 3A shows a simplified view of the prior art roll of FIG. 1A in a deflected position.
Figure 3B:
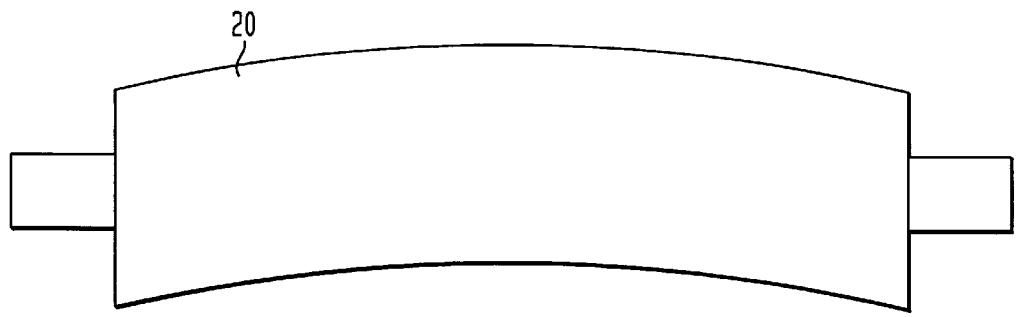
FIG. 3B shows a simplified view of the prior art roll of FIG. 1B in a deflected position.

FIG. 3A shows a simplified view of the roll 20 of FIGS. 1A and 2A in a deflected orientation. The mating roll 24 may also deflect as indicated by the dashed lines. The deflection of the roll 20 may be the result of deflecting forces applied to the exterior surface 32 of the roll by a web (not shown), and by gravity. FIG. 3B shows a simplified view of the roll 20' of FIGS. 1B and 2B in a deflected state. The roll deflection shown in FIGS. 3A and 3B can have detrimental effects on the rolls, the machinery containing the rolls or the products being produced using the rolls. The present invention is directed towards a control system that both detects roll deflection anywhere on a roll and actively corrects a deflection condition anywhere on the roll for rapidly and efficiently returning the roll to an undeflected state. In certain embodiments, it may be preferable to detect and/or correct roll deflection only at the portion of the roll at the nip. To a broader extent, the present invention is directed toward providing a control system for a dynamic surface for detecting the occurrence of a deflection in a dynamic surface, measuring the magnitude of the deflection, and then operating actuators to return the dynamic surface to an undeflected condition.

Figure 4A:
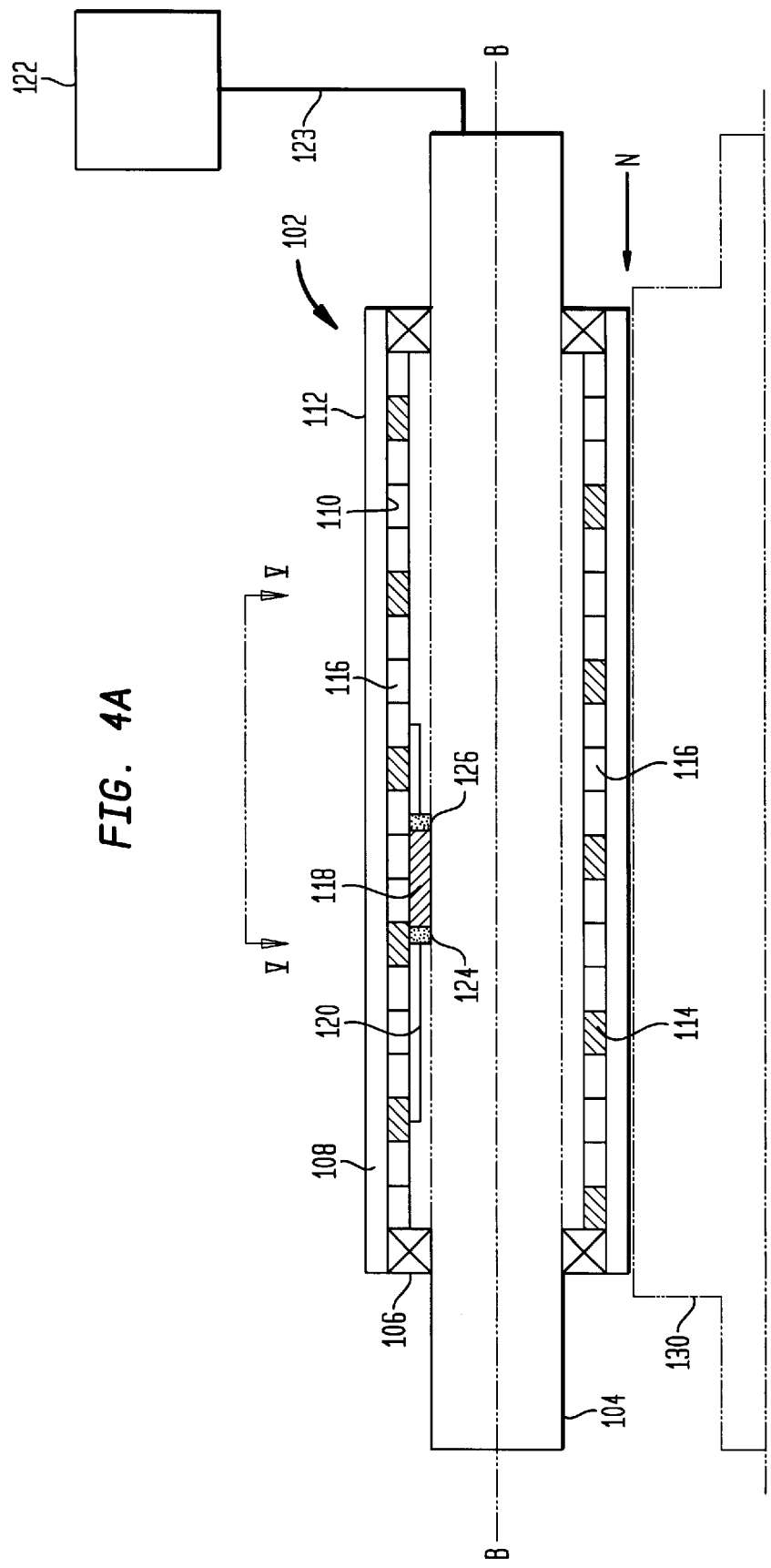
FIG. 4A is a schematic side view of a roll including a system for controlling deflection of the roll, in accordance with certain preferred embodiments of the present invention.

FIG. 4A shows a deflection control system 100 for a roll 102 in accordance with certain preferred embodiments of the present invention. The roll 102 includes an axle 104 having bearings 106 for supporting a roll shell 108. The roll shown in FIG. 4A is commonly referred to as a non-coated roll. A non-coated roll is typically made by providing a roll shell, such as a solid steel shell, that supplies the main support for the roll. The roll shell 108 has a longitudinal axis that is substantially parallel to the longitudinal axis B—B of axle 104. The roll shell 108 is generally cylindrical or tubular and includes an inner surface 110 defining an inner diameter and an exterior surface 112 defining an outer diameter. The outer diameter (O.D.) of the roll 102 is defined by the exterior surface 112 of roll shell 108.

The deflection control system also includes a plurality of sensors 114 and a plurality of piezoelectric actuators 116 connected to the interior surface 110 of the roll shell 108. The sensors 114 and piezoelectric actuators 116 are in signal sending and receiving communication with a controller 118 via conductive traces 120 extending between the sensors 114 and piezoelectric actuators 116, and the controller 118. For clarity of illustration, FIG. 4A shows only one sensor 114 and one piezoelectric actuator 116 connected to controller 118, however, it should be understood that all of the sensors and actuators are preferably in signal sending and receiving communication with the controller. In the particular embodiment shown in FIG. 4A, the controller 118 is located within the roll 102 for rotating simultaneously with the roll, the sensors 114 and the piezoelectric actuators 116. Power for the controller may be provided from a stationary power source 122 through a power line 123 that extends through axle 104. The energy is transmitted from the stationary power source to the rotating controller via a connection mechanism, such as a slip ring, that will not twist the power line 123. The controller 118 preferably includes a microprocessor 124 and a memory device 126 for storing a deflection control strategy or data related to preferred operating conditions for the roll 102 and roll shell 108. The controller 118 preferably uses one or more software applications stored therein capable of receiving feedback signals from the sensors 114, comparing the feedback signals with data stored in the memory device 126 and generating a series of output signals for transmission to the piezoelectric actuators 116. Upon receiving the output signals, the piezoelectric actuators are actuated for removing deflections in the roll shell 108, as will be described in more detail below.

In operation, a moving web (not shown) passes through a nip N created by roll 102 and mating roll 130. The roll 102 and mating roll 130 are shown in a generally horizontal orientation, however, the deflection control system of the present invention is also intended for use when the rolls 102, 130 have a substantially vertical orientation or any other geometric orientation. For clarity of illustration, FIG. 4A shows two rolls: roll 102 and mating roll 130. However, the present invention may also be used for controlling deflections having three or more rolls in contact with one another including a calendar stack of rolls whereby at least one of the rolls in the stack has two or more nip surfaces.

FIG. 4B shows a fragmentary view of a roll having a deflection control system in accordance with further preferred embodiments of the present invention. The FIG. 4B embodiment is substantially similar to the embodiment shown in FIG. 4A, however, the FIG. 4B embodiment includes a coated roll 102' having a roll shell 108'. The roll shell 108' includes a flexible coating 108A' overlying a structural support member 108B'. The flexible coating preferably includes a flexible material such as an elastomer (e.g. rubber) or cloth. When the flexible material is an elastomer, the structural support member 108B' is preferably a solid tube, such as a steel tube. The outer diameter of the coated roll 102' is defined by the exterior surface 112' of the flexible coating 108A'. Both the non-coated roll 102 of FIG. 4A and the coated roll 102' of FIG. 4B are dynamically flexible and include dynamic surfaces as that term is defined herein. As a result, the rolls of FIGS. 4A and 4B may deflect and/or vibrate during operation.

FIG. 4C shows another embodiment of the present invention having the sensors 114" and piezoelectric actuators 116" on the outer diameter 112" of the roll 102". The roll 102" is a coated roll including a roll shell 108" including a flexible coating 108A" overlying a structural support member 108B". The sensors 114" and piezoelectric actuators 116" are on the exterior surface 112" of the flexible coating 108A". In further embodiments, the roll may be a non-coated roll and the sensors and actuators are provided on the exterior surface of the roll shell (i.e., the exterior surface of the structural support member).

Although the present specification provides a detailed description of the deflection control system of the present invention when describing the roll 102 embodiment shown in FIG. 4A, the present invention is equally applicable to the coated roll 102' embodiment shown in FIG. 4B, the roll 102" embodiment shown in FIG. 4C, or any other type of dynamic surface.

Figure 5:
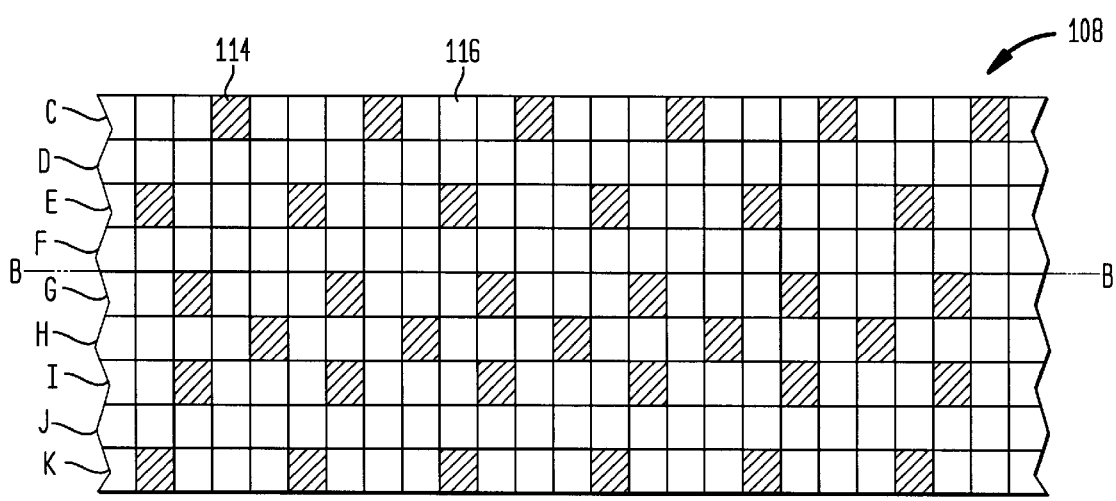
FIG. 5 is a fragmentary top view of a the roll taken along lines V—V of FIG. 4A including a plurality of sensors and piezoelectric actuators in contact with the dynamic surface of the roll, in accordance with certain preferred embodiments of the present invention.

FIG. 5 shows a fragmentary view of FIG. 4A, taken along lines IV—IV, showing sensors 114 and piezoelectric actuators 116 connected to the inner surface 110 of the roll shell 108. The piezoelectric actuators 116 are preferably aligned in rows C, D, E, F, G, H and I that extend substantially parallel to the longitudinal axis B—B of the roll shell 108. Each piezoelectric actuator 116 preferably has a length of approximately 1 to 5 centimeters, a width of approximately 1 to 5 centimeters, and a height of less than one centimeter. Thus, each piezoelectric actuator 116 generally covers an area of approximately 1–25 cm$^2$. The sensors 114 are interspersed between the piezoelectric actuators 116 and are preferably spaced so that the controller is able to monitor the entire dynamic surface of the roll. The sensors are designed for detecting the presence of a deflecting force on the dynamic surface of the roll shell 108. As used herein, the term "deflecting force" may include any force that causes the dynamic surface of the roll to deflect, including a pressure force, a tensile force or a compressive force.

The number of piezoelectric actuators 116 generally outnumbers the number of sensors 114 by a significant amount. In one preferred embodiment, the ratio of piezoelectric actuators to sensors is approximately 100:1. Preferred sensors include piezoelectric elements, strain gauges, a laser and reflective element sub-assembly, an optical device, a capacitive device, and/or a magnetic device. In the preferred embodiment shown in FIGS. 4A and 5, the sensors are piezoelectric elements capable of detecting a deflecting force on the dynamic surface of the roll. Such a deflecting force will cause the piezoelectric sensor to stretch or compress. The piezoelectric sensor will then transform the physical movement into an electric signal, whereby the magnitude of the electric signal is proportional to the magnitude of the physical movement of the sensor. The electric signal is the feedback signal that is sent to the controller. The electric signal may be either an electric voltage signal or a current signal.

Figure 6:
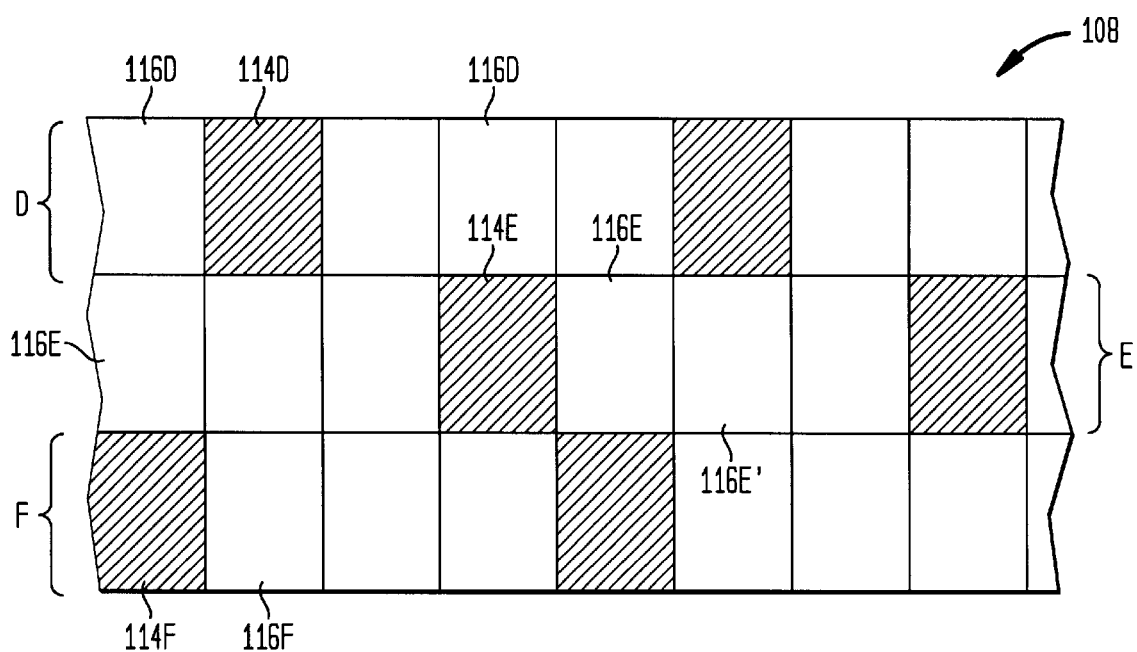
FIG. 6 shows a fragmentary view, on an enlarged scale, of the dynamic surface of the roll shown in FIG. 5.

FIG. 6 shows an enlarged fragmentary view of rows D, E and F of FIG. 5. Each row includes a plurality of piezoelectric actuators 116 with sensors 114 interspersed between the piezoelectric actuators. The sensors 114 preferably monitor a specific region of the roll shell 108 to detect whether that region is subjected to a deflecting force. Each sensor 114 operates independently of one another. For example, sensor 114 F in row F may detect a deflecting force while sensor 114E of row E detects no deflecting force. The piezoelectric actuators may also operate independently of one another. For example, piezoelectric actuator 116F may apply a counter deflecting force to the roll shell while piezoelectric actuator 116E is not actuated and applies no counter force to the roll shell. Moreover, piezoelectric actuators adjacent one another may apply counter forces having different magnitudes, e.g. piezoelectric actuator 116E applies a counter deflecting force having a greater magnitude that the force applies by piezoelectric actuator 116E'. The actual magnitude of the counter force applied by any one piezoelectric actuator is proportional to the magnitude of the electric signal received from the controller 118 (FIG. 4). Although the actuators 116 are depicted in rows, the present invention includes embodiments where the actuators are arranged randomly or in a pattern. The sensors 114 may also be arranged in a pattern or randomly.

Referring to FIGS. 4A and 6, during operation or rotation of the roll 102, the region of the roll shell 108 overlying row D may be in contact with a moving web while regions of the roll shell overlying rows E and F are not in contact with the web. As a result, the moving web deflects the roll shell overlying row D while rows E and F remain undeflected. Thus, the sensors 114D in row D will detect a deflecting force while the sensors 114E and 114F of respective rows E and F will not detect a deflecting force. In response, output signals sent from the controller to piezoelectric actuators 116D of row D will physically move those piezoelectric actuators for returning the dynamic surface of the roll shell 108 overlying actuators 116D to an undeflected state. However, no output signals will be sent to the piezoelectric actuators 116E and 116F in rows E and F. As such, piezoelectric actuators will only be activated by output signals when necessary to correct deformation of the roll shell or when it is desirable to actively deflect the dynamic surface of the roll shell. The force applied by each actuator in any one row may vary. For example, the actuators in the center of a row may apply more compressive force than the actuators adjacent a journal. In addition, in any one row, the actuators adjacent one journal may provide more compressive force than the actuators adjacent an opposed journal.

Figure 7:
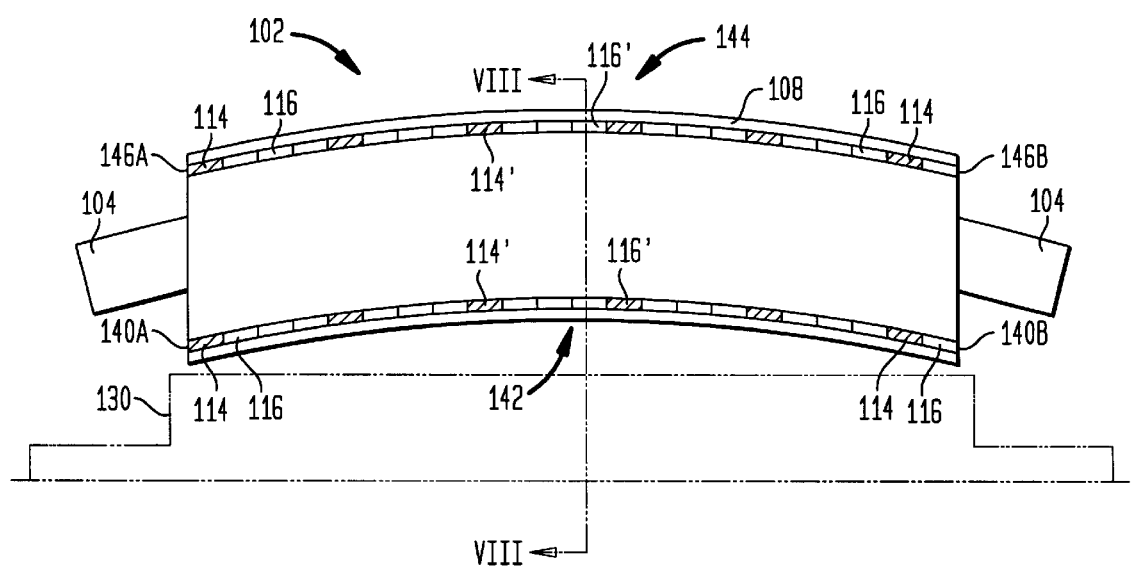
FIG. 7 shows a simplified sectional or fragmentary side view of the roll shown in FIG. 4A when the roll is deflected.
Figure 8:
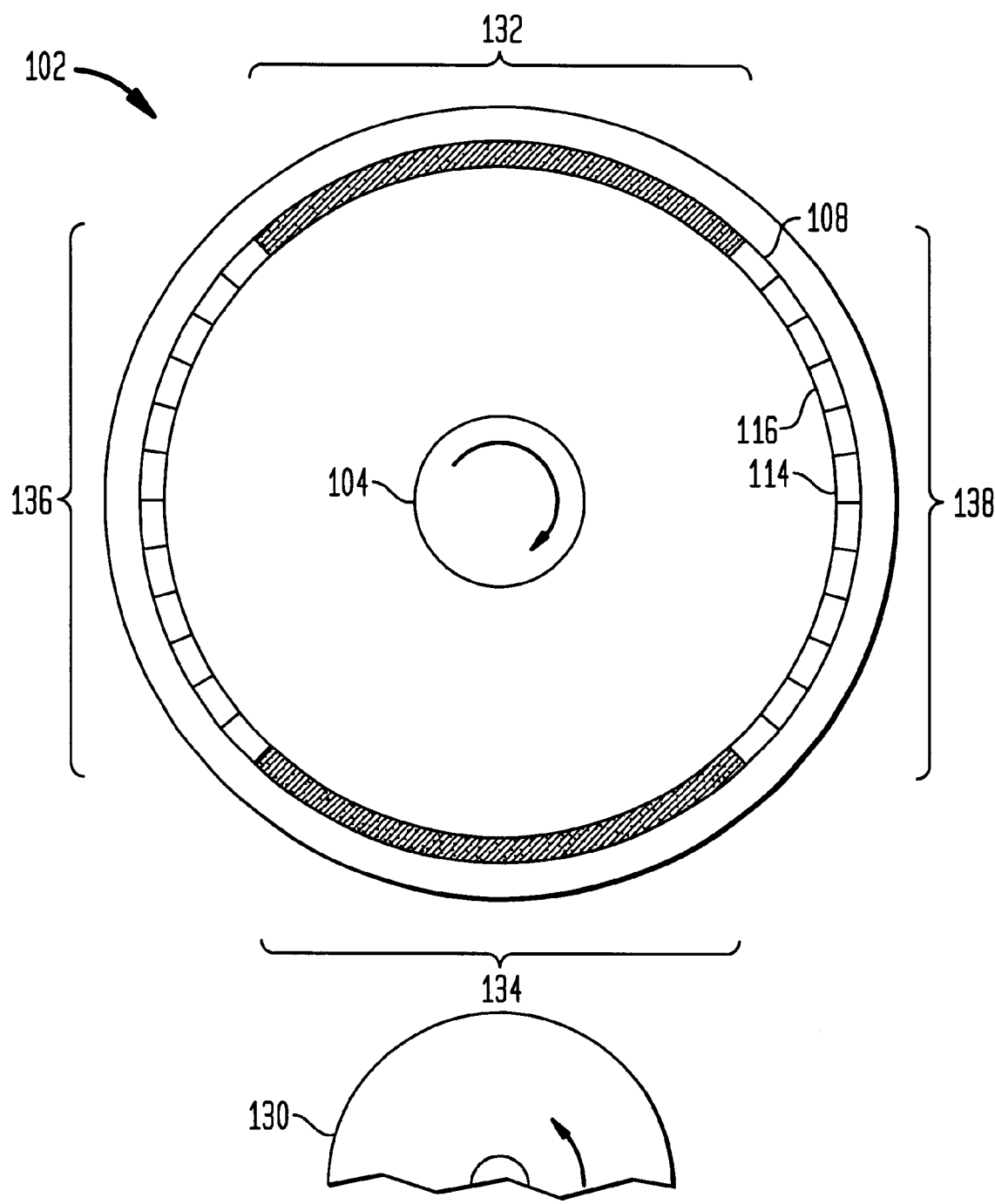
FIG. 8 shows a sectional view taken along lines VIII—VIII of FIG. 7 when the roll is deflected.

FIGS. 7 and 8 show the roll 102 of FIG. 4A before activation of the deflection control system of the present invention. During operation of the roll, a web 128 (not shown in FIG. 7) passes between the roll 102 and mating roll 130. The rotational speed of the roll 102 is dependent upon a number of factors including the speed of the web passing between roll 102 and mating roll 130 and the outer diameter of the roll. Referring to FIG. 8, in response to a number of deflecting forces, including web tension, nip pressure and gravity, the roll 102 and the roll shell 108 deform, placing an upper portion 132 of the roll shell 108 under tension and the lower end 134 of the roll shell under compression. Moreover, when the roll has a relatively high rate of rotation (e.g., 5000 revolutions/minute), there are additional forces acting upon the roll 102 and roll shell 108 including dynamic influences such as imbalance and modal excitation. As set forth above, roll deflection is undesirable because it will have an adverse effect on the material 128 (e.g. a web) passing between the roll 102 and the mating roll 130.

Referring to FIGS. 7 and 8, the sensors 114B in the vicinity of the lower end 134 of the roll shell 108 are activated for detecting that the dynamic surface of the roll 102 is under compression and will send feedback signals to the controller (FIG. 4) relaying such information. The feedback signals generated by the sensors 114B near the ends 140A, 140B of the roll shell 108 will have an intensity that is less than the intensity of the feedback signals generated by the sensors 114B' near the middle 142 of the roll. Upon receiving feedback signals from the sensors 114B located at the bottom of the roll shell, the controller will determine that the lower portion of the roll shell is under compression. The controller will then calculate output signals to be sent to each of the piezoelectric actuators 116B located in the bottom 134 of the roll shell. The magnitude of the output signals sent to the individual piezoelectric actuators may vary. This is because the amount of correction required at the outer ends 140A, 140B of the roll may be less than the amount of correction required in the middle 142 of the roll. As a result, the magnitude of the signals sent to the piezoelectric actuators 116B at the ends of the roll may be less than the magnitude of the signals sent to the piezoelectric actuators 116B' at the middle 142 of the roll. Upon receiving the output signals from the controller, the piezoelectric actuators 116 at the lower end 134 of the roll 108 will exert tensile forces on the dynamic surface of the roll for returning the lower end of the roll to a substantially flat, straight or undeflected orientation. As used herein, the term "flat" is directed to a planar surface area on a roll having a length and a width. The term "straight" is directed to a straight line across the surface of a roll having only one dimension. In certain embodiments, one or more piezoelectric actuators may "max out", i.e. a condition where the piezoelectric actuator is exerting a maximum force and this maximum force is not enough to completely remove a localized deflection in the dynamic surface. In these instances, piezoelectric actuators located outside the area of the deflection may be actuated to assist the "maxed out" piezoelectric actuators.

Simultaneously, the sensors 114A and piezoelectric actuators 116A at the upper end 132 of the roll are also operating in order to remove any deflections from the dynamic surface of the roll 108. Referring to FIGS. 7 and 8, the upper end 132 of the roll is under tension, with the sensors 114A' located at the middle portion 144 of the roll detecting greater tension than the sensors 114A at the outer ends 146A, 146B of the roll. Upon receiving feedback signals from the sensors 114A located at the upper end of the roll 108, the controller (FIG. 4) will determine the magnitude of the output signals that must be sent to each of the respective piezoelectric actuators 116 in order to remove the deflection from the dynamic surface at the upper end 132 of the roll 108.

Referring to FIG. 8, the piezoelectric actuators 116 and sensors at the first and second sides 136, 138 of the roll 102 may be inactivated, while the piezoelectric actuators and sensors at the upper and lower ends of the roll remain activated. In other embodiments, the sensors may remain active at all times, however, the actuators may be deactivated because removing deflections from the sides may be unnecessary or undesirable. Although the first and second sides 136, 138 may be deflected, the roll at these locations is generally not under stress or strain. Moreover, activating the piezoelectric actuators at sides 136, 138 may have little or no effect on correcting roll deflection as depicted in the figures. Thus, there is generally no need to send output signals to the piezoelectric actuators at the first and second sides 136, 138. Nevertheless, the sensors 114 located in the vicinity of the first and second sides 136, 138 continuously monitor the dynamic surface of the roll to detect deflecting forces acting upon the dynamic surface. In other preferred embodiments, the control strategy may include applying a tension force on one side of the roll and applying a compression force on the opposite side of the roll, whereby the applied tension and compression forces are approximately 180 degrees apart. In further embodiments, the control strategy may result in tension forces being applied simultaneously to opposed sides of a roll. In still further embodiments, a tension or compression force may be applied to one side of the roll while the actuators on the opposite side of the roll remain inactive. This strategy may be used when it is desirable to control roll deflection only when the dynamic surface of the roll is at the nip. Other preferred control strategies may include activating or deactivating opposed actuators in unison or separately.

FIG. 8 provides merely a "snap-shot" in time as the roll 102 revolves about axle 104. It should be understood that the roll is continuously rotating and may rotate anywhere within a range of approximately 2 revolutions/hour to 5000 revolutions/minute. Thus, each piezoelectric actuator may continuously switch between active/inactive states and/or tensile/compressive states many times each second. When an actuator is active, it may switch between tensile, neutral or compressive states many times each second. The exact frequency for switching between the various states depends upon the rotational speed of the roll which, in turn, depends upon the speed of the web and the outer diameter (O.D.) of the roll.

Figure 9A:
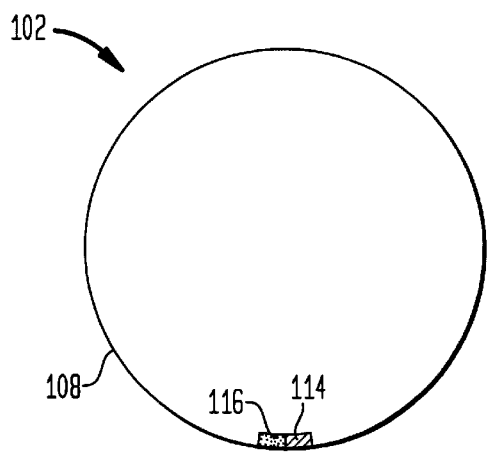
FIGS. 9A–9D show a simplified view of the roll of FIG. 8 during various stages of revolution of the roll.

FIGS. 9A–9D show a simplified view of FIG. 8 showing one sensor 114 and one piezoelectric actuator 116 during one complete revolution of roll 102. In FIG. 9A the sensor 114 detects that the dynamic surface of the roll 108 is under compression. As a result, the sensor 116 measures the magnitude of the compression force and generates a feedback signal proportional to the magnitude of the compression force. Upon receiving the feedback signal, the controller (FIG. 4) compares the magnitude of the feedback signal to data stored in the memory. The controller then calculates how much tensile force must be exerted by piezoelectric actuator 116 upon the dynamic surface in order to return the roll to an undeflected condition. The controller then generates and transmits an output signal to the piezoelectric actuator 116 having a sufficient magnitude for returning the dynamic surface to an undeflected condition.

Figure 9B:
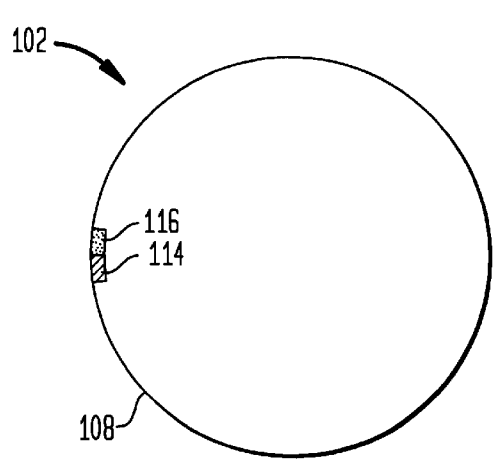

The roll 102 continues to rotate until the sensor 114 and piezoelectric actuator 116 reach the location shown in FIG. 9B. At this location, the dynamic surface may be undeflected so that the dynamic surface is subjected to neither tensile nor compressive forces. As a result, the feedback signal transmitted from the sensor 114 to the controller will indicate that there is no deflection. The controller will determine that there is no need to send a correcting signal to the piezoelectric actuator 116. In other embodiments, the control strategy of the controller may be to deactivate the piezoelectric actuator 116 when it is in the position shown in FIG. 9B. As a result, the controller will not send a correcting signal to the actuator 116, regardless of whether or not the sensor detects compression or deflection of the roll.

Figure 9C:
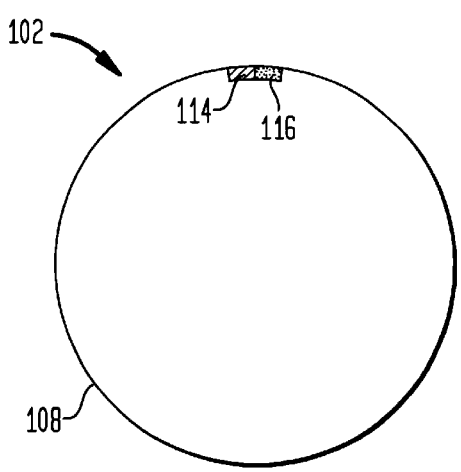

When the sensor 114 and the piezoelectric actuator 116 reach the position shown in FIG. 9C, the sensor will detect tensile forces on the roll. The sensor 114 will transmit a feedback signal to the control device indicating that the dynamic surface is under tension. In response, the controller will generate an output signal proportional to the feedback signal for transmission to the piezoelectric actuator 116. Upon receiving the feedback signal, the piezoelectric actuator 116 will apply a compression force to the dynamic surface of the roll for urging the dynamic surface into a substantially undeflected orientation.

Figure 9D:
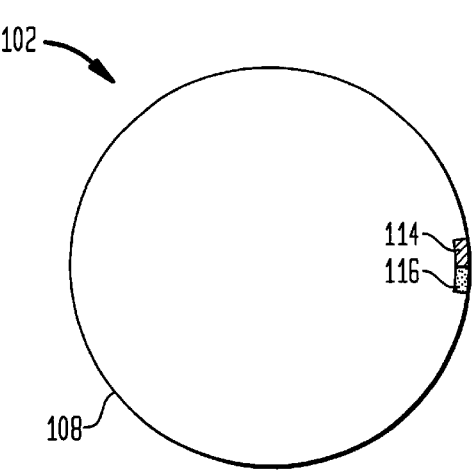

The roll continues to rotate until the sensor 114 and piezoelectric actuator 116 reach the position shown in FIG. 9D. In this position, there may once again be no compression or tensile forces upon the dynamic surface of the roll. As a result, the sensor 114 will transmit a feedback signal to the controller indicating that the dynamic surface is substantially undeflected. Because there is no need to change the shape of the dynamic surface, the controller will not transmit a correcting signal to the piezoelectric actuator 116. As mentioned above, the roll shown in FIGS. 9A–9D will continue to revolve about the axle 104 at a rate of approximately 2 revolutions/hour to 5000 revolutions/minute. Thus, it is possible for the piezoelectric actuators 116 to switch between active/inactive states and/or tensile/compressive states, or any combination or series of active/inactive/tensile/neutral/compressive states thousands of times per minute. Moreover, counter deflecting forces applied by each piezoelectric actuator may be precisely controlled by precisely controlling the magnitude of the electric signal sent to each piezoelectric actuator.

Figure 10:
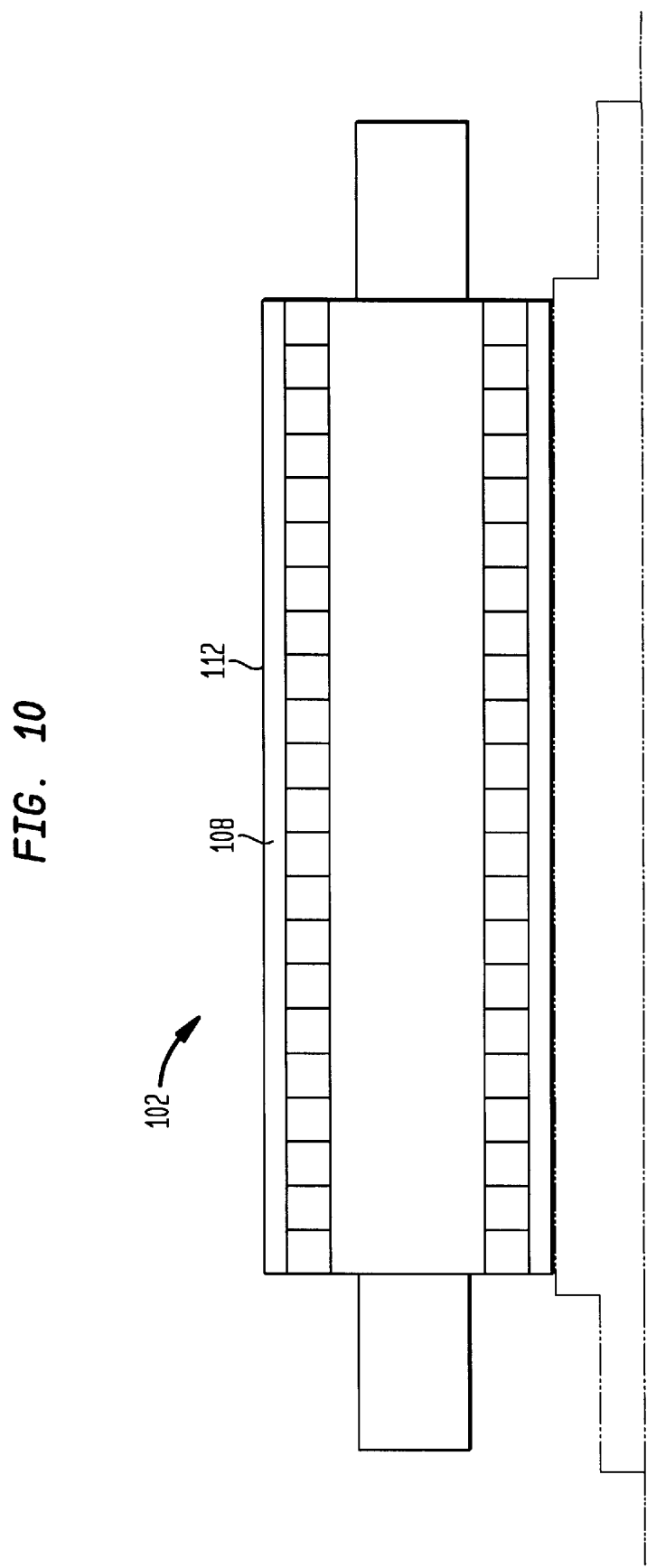
FIG. 10 shows a simplified side view of the roll of FIG. 7 after deflection control system of the present invention has returned the roll to an undeflected state.

FIG. 10 shows the roll 102 of FIG. 7 after the deflection control system has been activated. The dynamic surface 112 of the roll 108 remains substantially undeflected during revolution of the roll even though deflecting forces continue to act upon the roll 108. The dynamic surface 112 of the roll will remain undeflected as long as the deflection control system continues to operate.

FIG. 11A shows a deflection control system 200 for a non-coated roll 202 in accordance with further preferred embodiments of the present invention. The roll 202 includes a roll shell 208 having first and second ends 215A and 215B. The system includes first and second supports 217A and 217B for supporting the first and second ends 215A and 215B of the roll shell 208. The supports 217A and 217B are connected with the interior surface 210 of the roll shell 208 for supporting rotation of the roll 202. The supports 217A and 217B extend beyond the ends 215A and 215B of the roll shell 208 to bearings 206 so that the roll 202 may rotate about longitudinal axis C—C. The roll 202 includes a controller 218 for controlling deflection of the roll shell 208. The controller 218 is in communication with sensors 214 and piezoelectric actuators 216 via traces 220. FIG. 11A shows only one sensor 214 and one piezoelectric actuator 216 connected to controller 218, however, it should be understood that all of the sensors and actuators are preferably in signal sending and receiving communication with the controller. The controller 218 is preferably located within roll shell 208 for rotating simultaneously with the roll shell, the sensors 214 and the piezoelectric actuators 216. Power for the controller 218 may be provided from a power source 222 through a power line 223 that extends through one of the structural members 217. The controller 118 operates in a manner that is substantially similar to that described above in regards to FIG. 4A.

Figure 11B:
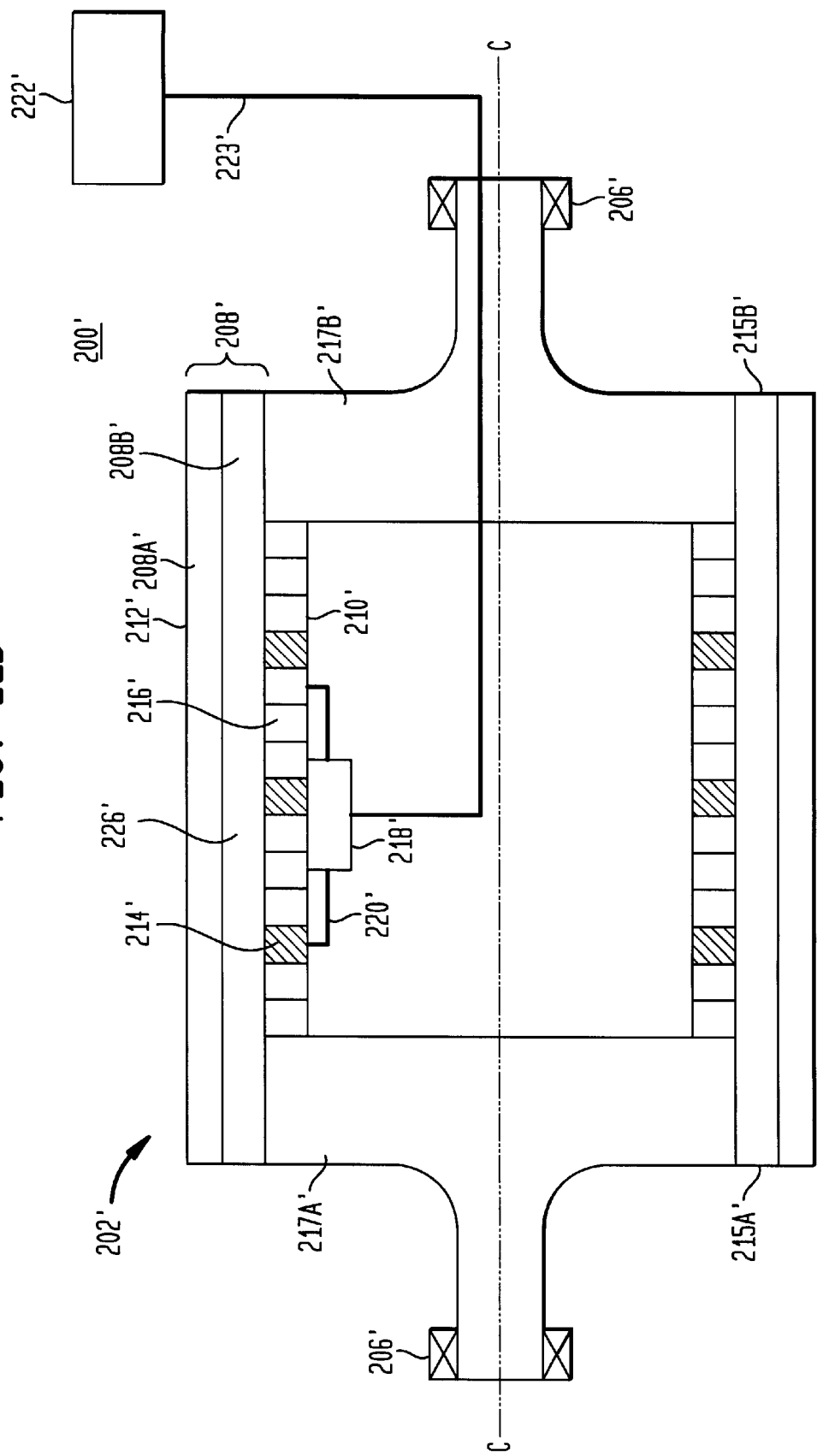
FIG. 11B is a schematic side view of a coated roll including a system for controlling deflection of the roll, in accordance with still further preferred embodiments of the present invention.

FIG. 11B shows another embodiment of the present invention that is substantially similar to the FIG. 11A embodiment, however, the FIG. 11B embodiment includes a coated roll 202'. The coated roll 202' includes a roll shell 208' having a flexible coating 208A' surrounding structural support member 208B'. The outer diameter of the coated roll 202' is defined by the exterior surface 212' of the flexible coating 208A'. Both the non-coated roll 202 of FIG. 11A and the coated roll 202' of FIG. 11B are dynamically flexible and include dynamic surfaces as that term is defined herein. As a result, the non-coated and coated rolls disclosed herein may deflect and/or vibrate during operation.

Figure 12:
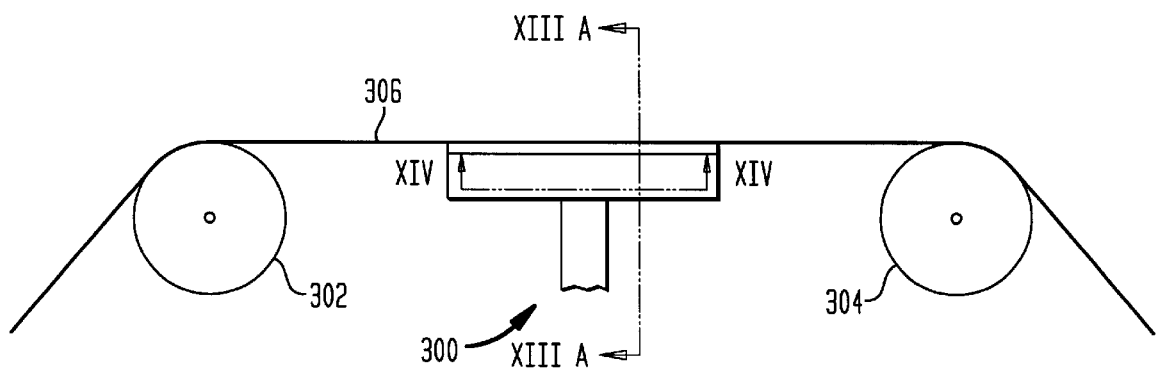
FIG. 12 shows a schematic side view of a system for controlling deflection of a dynamic surface, in accordance with further preferred embodiments of the present invention.

FIGS. 12–15 show a deflection control system in accordance with further preferred embodiments of the present invention. Referring to FIG. 12, a web support element 300 is provided between two rolls 302 and 304. The web support element supports a web 306 moving between first roll 302 and second roll 304. Referring to FIG. 13A, the web support element 300 includes a web support layer 308 having a first surface 310 for engaging the web 306 and a second surface 312 remote therefrom. The second surface 312 of the web support layer 308 includes sensors 314 and piezoelectric actuators 316 connected thereto. FIG. 13B shows another embodiment, similar to the embodiment of FIG. 13A, including a mating roll 330', whereby a web 306' passes between the mating roll and the web support layer 308'.

Figure 14:
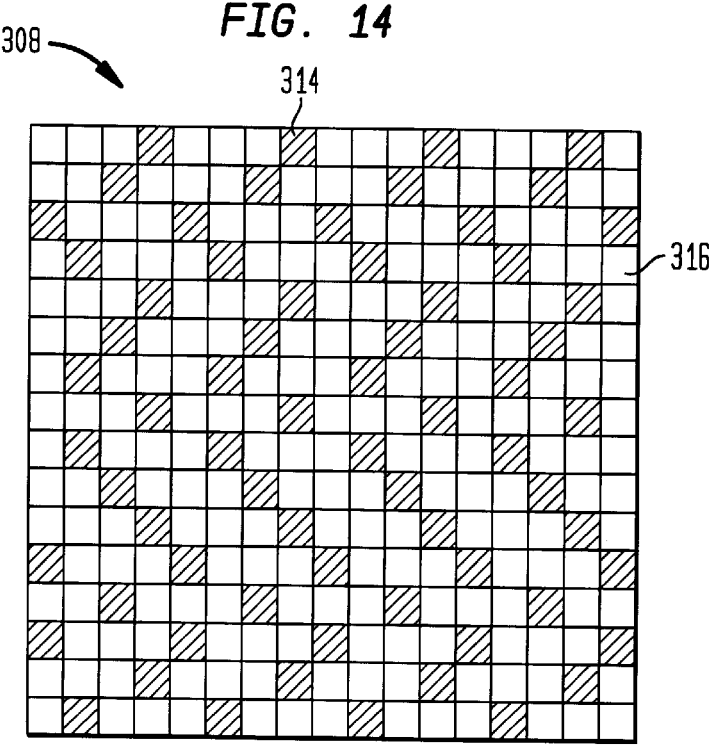
FIG. 14 shows a bottom view of the web support layer of FIG. 12 having sensors and piezoelectric actuators connected thereto taken along lines XIV—XIV of FIG. 12.
Figure 15:
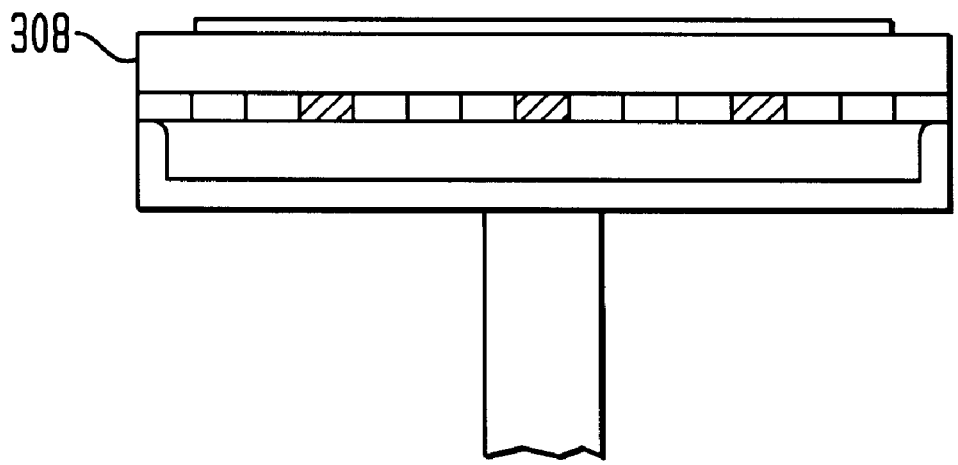
FIG. 15 shows the system of FIG. 12 after the dynamic surface has returned to an undeflected state.

Referring to FIG. 14, in one preferred embodiment, the web support layer 308 has a generally polygon shape and the piezoelectric actuators 316 are aligned in rows with sensors 314 interspersed therebetween. The ratio of piezoelectric actuators to sensors is approximately 100:1. The piezoelectric actuators and sensors may also be arranged in a pattern or randomly.

Figure 13A:
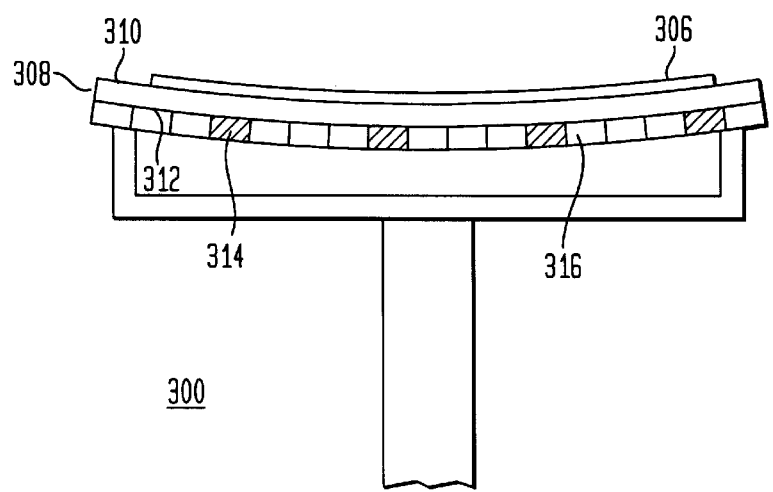
FIG. 13A is a sectional view taken along lines XII—XII of FIG. 12, showing the dynamic surface of a web support layer in a deflected position.
Figure 13B:
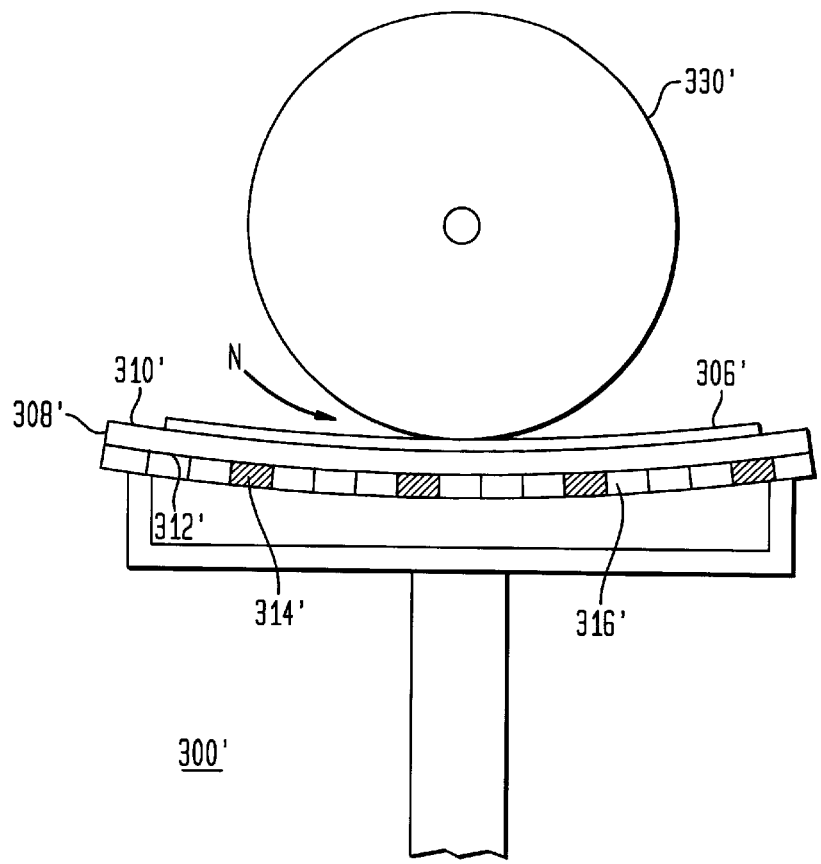
FIG. 13B shows a sectional view of a system for controlling deflection of a dynamic surface including a mating roll for creating nip pressure, in accordance with further preferred embodiments of the present invention.

FIG. 13A shows the web support element 300 with the web support layer 308 being deflected downwardly by the web 306. As a result, the second surface 312 of the web support layer is under tension. As a result, the sensors 314 in contact with the second surface 312 of the web support layer 308 will transmit feedback signals to the controller indicating that the web support layer is deflected. The controller will then calculate the magnitude of the electrical signals that must be sent to each of the piezoelectric actuators 316 in order to return the web support layer to an undeflected state. Upon receiving the output signals, the piezoelectric actuators 316 are actuated for applying compressive forces to the web support layer. The compression forces will return the web support layer 308 to the undeflected position shown in FIG. 15. The web support layer 308 shown in FIGS. 12–15 is substantially flat.

Figure 16:
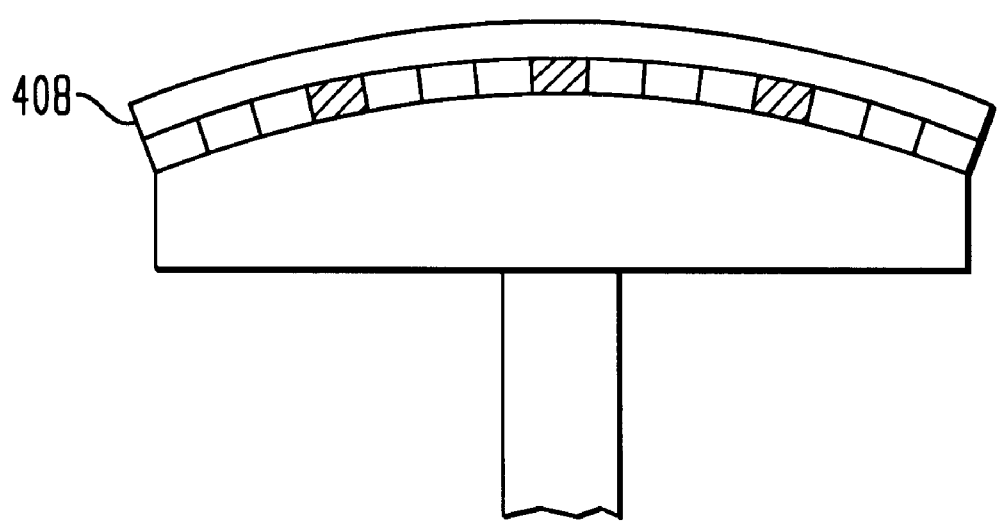
FIG. 16 shows a side view of a system for controlling deflection of a normally curved dynamic surface, in accordance with further preferred embodiments of the present invention.

FIG. 16 shows other preferred embodiments of the present invention whereby the control strategy of the deflection control system seeks to maintain the web support layer 408 in a predetermined shape. In one preferred embodiment, the predetermined shape is the curved shape shown in FIG. 16. However, the predetermined shape may be any geometric shape.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A system for controlling deflection of a dynamic surface comprising:
at least one sensor in communication with the dynamic surface for detecting the presence of a deflecting force on the dynamic surface and generating a feedback signal proportional to the deflecting force;
a controller in communication with said at least one sensor for receiving the feedback signal and generating an output signal in response to the feedback signal; and
at least one piezoelectric actuator in communication with the dynamic surface and in communication with said controller for receiving the output signal, wherein said piezoelectric actuator applies a counter force to the dynamic surface upon receiving the output signal.

2. The system as claimed in claim 1, further comprising a roll shell including said dynamic surface.

3. The system as claimed in claim 2, wherein said roll shell has an interior surface and an exterior surface.

4. The system as claimed in claim 3, wherein the exterior surface of said roll shell includes the dynamic surface.

5. The system as claimed in claim 3, wherein the interior surface of said roll shell includes the dynamic surface.

6. The system as claimed in claim 1, wherein said at least one sensor is connected to the dynamic surface.

7. The system as claimed in claim 3, wherein said at least one sensor is connected to the interior surface of said roll shell.

8. The system as claimed in claim 3, wherein said at least one sensor is connected to the exterior surface of said roll shell.

9. The system as claimed in claim 3, wherein said at least one piezoelectric actuator is connected to the dynamic surface.

10. The system as claimed in claim 3, wherein said at least one piezoelectric actuator is connected to the interior surface of said roll shell.

11. The system as claimed in claim 3, wherein said at least one piezoelectric actuator is connected to the exterior surface of said roll shell.

12. The system as claimed in claim 2, wherein said roll shell is rotatable about a central axis.

13. The system as claimed in claim 12, wherein said roll shell has a longitudinal axis substantially parallel to the central axis.

14. The system as claimed in claim 2, wherein said roll shell is substantially cylindrically shaped.

15. The system as claimed in claim 12, further comprising a support member for supporting rotation of said roll shell about said central axis.

16. The system as claimed in claim 15, wherein said support member includes an axle extending in a direction substantially parallel to the longitudinal axis of said roll shell.

17. The system as claimed in claim 15, wherein said roll shell has first and second ends and wherein said roll shell support includes first and second structural members supporting the interior surface of said roll support at the first and second ends thereof.

18. The system as claimed in claim 17, wherein said roll shell support includes bearings located external to said roll shell for engaging said first and second structural members and supporting rotation of said roll shell.

19. The system as claimed in claim 1, further comprising a non-coated roll including said dynamic surface.

20. The system as claimed in claim 1, further comprising a coated roll including said dynamic surface.

21. The system as claimed in claim 13, wherein the counter force applied by said at least one piezoelectric actuator generates a compressive force on the dynamic surface of said roll shell in a direction substantially parallel to the central axis thereof.

22. The system as claimed in claim 13, wherein the counter force applied by said at least one piezoelectric actuator generates a tensile force on the dynamic surface of said roll shell in a direction substantially parallel to the central axis thereof.

23. The system as claimed in claim 13, wherein the counter force applied by said at least one piezoelectric actuator generates compressive and tensile forces on the dynamic surface of said roll shell in directions substantially parallel to the central axis.

24. The system as claimed in claim 13, wherein the counter force applied by said at least one piezoelectric actuator generates compressive and tensile forces on the dynamic surface of said roll shell in directions substantially non-parallel to the central axis.

25. The system as claimed in claim 23, wherein the counter force applied by said at least one piezoelectric actuator generates a compressive force at one location of said roll and a tensile force at a second location opposite said first location.

26. The system as claimed in claim 1, wherein said at least one sensor measures a magnitude of the deflecting force on said dynamic surface.

27. The system as claimed in claim 26, wherein the counter force applied to the dynamic surface by said at least one piezoelectric actuator has a magnitude proportional to the magnitude of the feedback signal.

28. The system as claimed in claim 1, wherein said at least one sensor includes a plurality of sensors.

29. The system as claimed in claim 1, wherein said at least one piezoelectric actuator includes a plurality of piezoelectric elements.

30. The system as claimed in claim 2, wherein said at least one sensor includes a plurality of sensors and said at least one piezoelectric actuator includes a plurality of piezoelectric elements.

31. The system as claimed in claim 30, wherein said sensors and said piezoelectric actuators are in contact with the interior surface of said roll shell.

32. The system as claimed in claim 30, wherein said sensors and said piezoelectric actuators are in contact with the exterior surface of said roll shell.

33. The system as claimed in claim 31, wherein said piezoelectric actuators are aligned in rows over the interior surface of said shell.

34. The system as claimed in claim 30, wherein said sensors are interspersed between said piezoelectric actuators.

35. The system as claimed in claim 30, wherein the ratio of said piezoelectric actuators to said sensors is approximately 100:1.

36. The system as claimed in claim 1, wherein said at least one piezoelectric actuator has a length of approximately 1–5 cm., a width of approximately 1–5 cm., and a height of less than 1 cm.

37. The system as claimed in claim 1, wherein said at least one piezoelectric actuator covers an area of approximately 1–25 cm².

38. The system as claimed in claim 1, further comprising a web support layer including a first surface for engaging a web and a second surface remote therefrom, wherein the first surface of the web support layer includes the dynamic surface.

39. The system as claimed in claim 38, wherein said at least one sensor is in contact with the second surface of said web support layer.

40. The system as claimed in claim 38, wherein said at least one piezoelectric actuator is in contact with the second surface of said web support layer.

41. The system as claimed in claim 38, wherein said at least one sensor and said at least one piezoelectric actuator are in contact with the second surface of said web support layer.

42. The system as claimed in claim 38, wherein the dynamic surface of said web support layer includes a substantially flat section.

43. The system as claimed in claim 38, wherein the dynamic surface of said web support layer includes an arcuate section.

44. The system as claimed in claim 38, further comprising a support element for supporting said web support layer.

45. The system as claimed in claim 44, wherein said at least one sensor determines the position of said dynamic surface in relation to said support element for measuring the deflecting force on said dynamic surface.

46. The system as claimed in claim 1, wherein said at least one sensor includes a piezoelectric element.

47. The system as claimed in claim 1, wherein said at least one sensor includes a strain gauge.

48. The system as claimed in claim 1, wherein said at least one sensor includes a laser and a reflective element.

49. The system as claimed in claim 1, wherein said at least one sensor includes an optical device.

50. The system as claimed in claim 1, wherein said at least one sensor includes a capacitive device.

51. The system as claimed in claim 1, wherein said at least one sensor includes a magnetic device.

52. A system for controlling deflection of a dynamic surface having a predetermined shape comprising:

at least one sensor in communication with said dynamic surface for sensing a change in the predetermined shape of said dynamic surface and generating a feedback signal proportional to a magnitude of the change;

a controller in communication with said at least one sensor for receiving the feedback signal and generating an output signal in response to the feedback signal; and at least one piezoelectric actuator in communication with said controller and in communication with said dynamic surface for receiving the output signal, wherein upon receiving the output signal said at least one piezoelectric actuator applies a counter force on said dynamic surface for returning said dynamic surface to said predetermined shape.

53. The system as claimed in claim 52, further comprising a roll shell including the dynamic surface and a non-web contacting surface remote therefrom.

54. The system as claimed in claim 53, wherein said roll shell is rotatable about a central axis.

55. The system as claimed in claim 54, wherein said roll shell has a longitudinal axis substantially parallel to the central axis.

56. The system as claimed in claim 54, further comprising a roll shell support for supporting rotation of said roll shell about said central axis.

57. The system as claimed in claim 54, wherein the counter force applied by said at least one piezoelectric actuator generates compressive forces or tensile forces on the dynamic surface of said roll shell.

58. The system as claimed in claim 57, wherein the compressive forces and the tensile forces are generally opposed to one another.

59. The system as claimed in claim 13, wherein the counter force applied by said at least one piezoelectric actuator generates a compressive force on the dynamic surface of said roll shell in a direction substantially perpendicular to the central axis thereof.

60. The system as claimed in claim 13, wherein the counter force applied by said at least one piezoelectric actuator generates a tensile force on the dynamic surface of said roll shell in a direction substantially perpendicular to the central axis thereof.

61. The system as claimed in claim 13, wherein the counter force applied by said at least one piezoelectric actuator generates compressive and tensile forces on the dynamic surface of said roll shell in directions substantially perpendicular to the central axis.

* * * * *